(12) United States Patent
Ozawa et al.

(10) Patent No.: US 8,799,945 B2
(45) Date of Patent: Aug. 5, 2014

(54) INFORMATION PROCESSING APPARATUS, INFORMATION PROCESSING METHOD, AND COMPUTER PROGRAM

(75) Inventors: Takeshi Ozawa, Chiba (JP); Takashi Nomura, Tokyo (JP); Motofumi Itawaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 695 days.

(21) Appl. No.: 11/948,613

(22) Filed: Nov. 30, 2007

(65) Prior Publication Data

US 2008/0148313 A1     Jun. 19, 2008

(30) Foreign Application Priority Data

Dec. 19, 2006  (JP) ................................. 2006-341045

(51) Int. Cl.
*G06F 3/00* (2006.01)
(52) U.S. Cl.
USPC .......................................................... 725/39
(58) Field of Classification Search
None
See application file for complete search history.

(56) References Cited

U.S. PATENT DOCUMENTS

| 7,373,652 | B1 * | 5/2008 | Bayrakeri et al. | 725/53 |
| 7,509,663 | B2 * | 3/2009 | Maynard et al. | 725/10 |
| 8,156,436 | B2 * | 4/2012 | Matsutani | 715/727 |
| 2005/0125222 | A1 * | 6/2005 | Brown et al. | 704/200.1 |
| 2006/0015902 | A1 * | 1/2006 | Matsuura et al. | 725/46 |
| 2006/0242665 | A1 * | 10/2006 | Knee et al. | 725/38 |
| 2007/0061856 | A1 * | 3/2007 | Seki et al. | 725/105 |
| 2008/0092168 | A1 * | 4/2008 | Logan et al. | 725/44 |
| 2008/0253748 | A1 * | 10/2008 | Conklin | 386/124 |
| 2008/0288378 | A1 * | 11/2008 | Berstis et al. | 705/30 |
| 2012/0084818 | A1 * | 4/2012 | Ali et al. | 725/46 |

FOREIGN PATENT DOCUMENTS

| JP | 2002-101164 | 4/2002 |
| JP | 2002-152639 | 5/2002 |
| JP | 2003-087666 | 3/2003 |
| JP | 2004-140527 | 5/2004 |
| JP | 2005-244457 | 9/2005 |
| JP | 2006-318182 | 11/2006 |

OTHER PUBLICATIONS

Corresponding Japanese Patent Application No. JP 2006-341045, Office Action issued on Jun. 7, 2011.

* cited by examiner

*Primary Examiner* — Rong Le
(74) *Attorney, Agent, or Firm* — Finnegan, Henderson, Farabow, Garrett & Dunner, L.L.P.

(57) ABSTRACT

An information processing apparatus is disclosed. The apparatus includes: storing means for storing audio data and related information corresponding to the audio data; receiving means for acquiring electronic program guide information indicating programs scheduled to be broadcasted; and program selecting means for executing comparison processing for comparing predetermined related information corresponding to predetermined audio data among the audio data and the electronic program guide information and selecting, on the basis of a result of the comparison processing, a predetermined program from the broadcast-scheduled programs indicated by the electronic program guide information.

12 Claims, 18 Drawing Sheets

FIG. 3

AUDIO FILE METADATA TABLE

| AUDIO FILE ID | MUSIC TITLE | ARTIST NAME | ARTIST ID | FILE ASSOCIATED RATING POINT |
|---|---|---|---|---|
| M01 | ABCD | ARTIST A | A01 | 10 |
| M02 | EFGH | ARTIST A | A01 | 20 |
| M03 | IJKL | ARTIST A | A01 | 0 |
| M04 | MNOP | ARTIST B | A02 | 20 |
| M05 | QRST | ARTIST C | A03 | 10 |
| M06 | UVWX | ARTIST C | A03 | 0 |

FIG. 4

ARTIST LIST TABLE

| ARTIST ID | ARTIST NAME | ARTIST ASSOCIATED RATING POINT | ASSOCIATED AUDIO FILE | ASSOCIATED RECORDING FILE |
|---|---|---|---|---|
| A01 | ARTIST A | 10 | M01, M02, M03 | — |
| A02 | ARTIST B | 20 | M04 | — |
| A03 | ARTIST C | 5 | M05, M06 | — |

FIG. 6

PROGRAM UNIT INFORMATION IN EPG

| BROADCASTING STATION NAME | TELEVISION NIPPON |
|---|---|
| GENRE | MUSIC |
| PROGRAM TITLE | OUR MUSIC |
| START DATE AND TIME | 2006/9/15 (FRI) 23:00 |
| END DATE AND TIME | 2006/9/15 (FRI) 23:58 |
| PROGRAM CONTENT | TOTAL COLLECTION OF MUSICAL MASTERPIECES CAST: ARTIST A, ARTIST D |

FIG. 9

RECORDING FILE ASSOCIATED METADATA

| | |
|---|---|
| RECORDING FILE ID | V01 |
| BROADCASTING STATION NAME | TELEVISION NIPPON |
| GENRE | MUSIC |
| PROGRAM TITLE | OUR MUSIC |
| START DATE AND TIME | 2006/9/15 (FRI) 23:00 |
| END DATE AND TIME | 2006/9/15 (FRI) 23:58 |
| PROGRAM CONTENT | TOTAL COLLECTION OF MUSICAL MASTERPIECES CAST: ARTIST A, ARTIST C |
| SCHEDULING KEY INFORMATION | A01 (ARTIST A) |

FIG. 10

ARTIST LIST TABLE

| ARTIST ID | ARTIST NAME | ARTIST ASSOCIATED RATING POINT | ASSOCIATED AUDIO FILE | ASSOCIATED RECORDING FILE |
|---|---|---|---|---|
| A01 | ARTIST A | 10 | M01, M02, M03 | V01 |
| A02 | ARTIST B | 20 | M04 | — |
| A03 | ARTIST C | 5 | M05, M06 | — |

[SELECT AND DETERMINE TITLE FROM AUDIO TITLE LIST SCREEN OF ARTIST A]

[SELECT AND DETERMINE RECORDING FILE FROM VIDEO TITLE LIST WINDOW]

[SELECT AND DETERMINE TITLE FROM RECORDING FILE LIST SCREEN]

[SELECT AND DETERMINE TITLE FROM AUDIO TITLE LIST WINDOW]

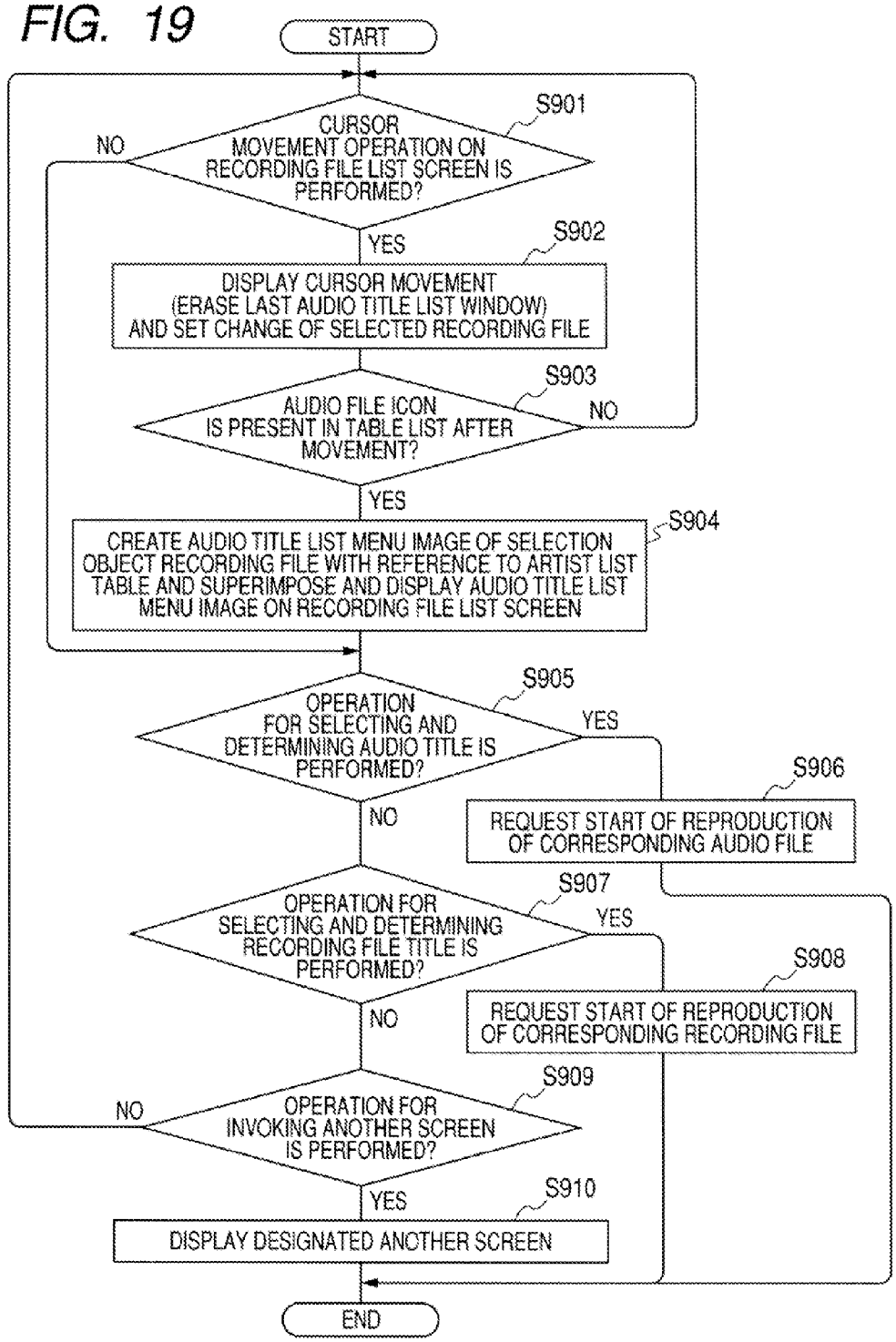

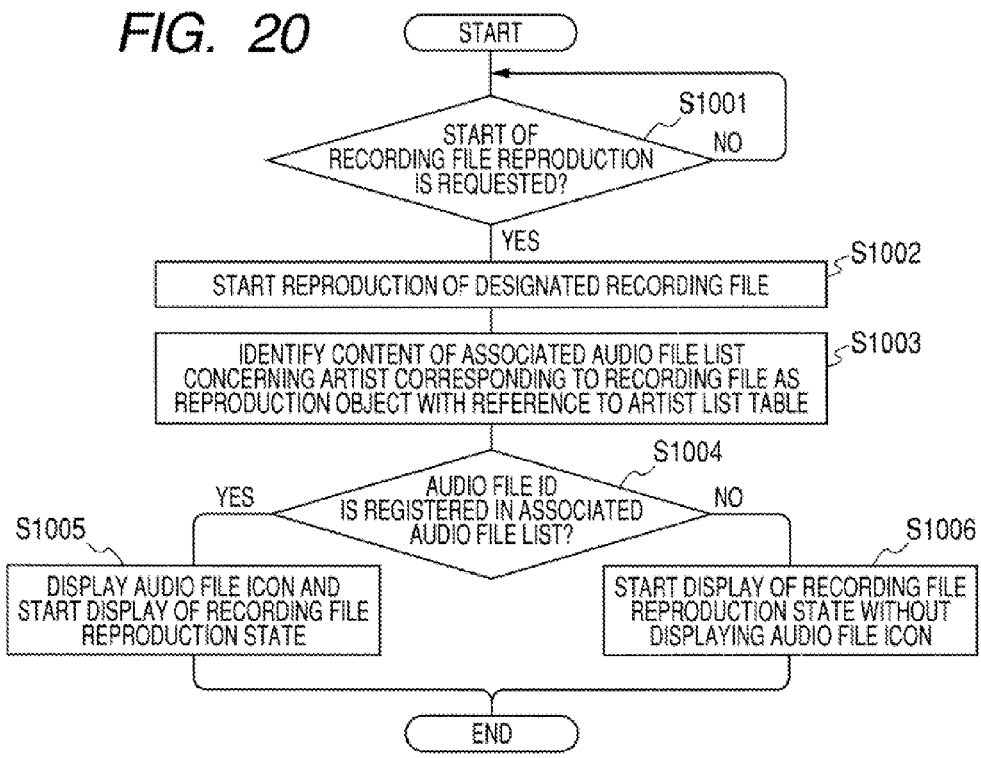
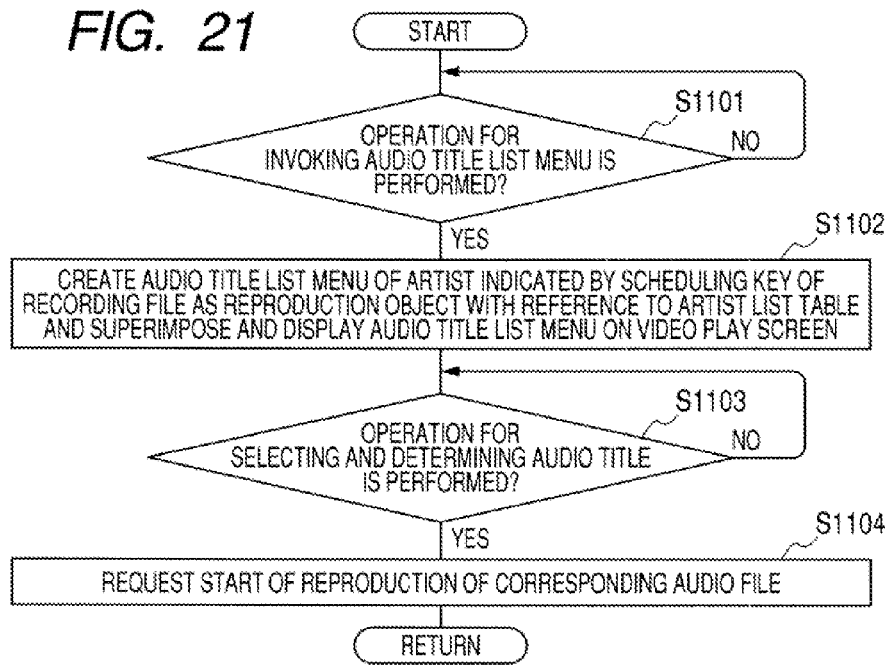

INFORMATION PROCESSING APPARATUS, INFORMATION PROCESSING METHOD, AND COMPUTER PROGRAM

CROSS-REFERENCES TO RELATED APPLICATIONS

The present invention contains subject matter related to Japanese Patent Application JP 2006-341045 filed in the Japanese Patent Office on Dec. 19, 2006, the entire contents of which being incorporated herein by reference.

BACKGROUND OF THE INVENTION

1. Field of the Invention

The present invention relates to an information processing apparatus that is adapted to execute information processing using, for example, metadata (related information associated with sound information) attached to unit sound information equivalent to a music unit and information contents forming electronic program guide information concerning television broadcast and a method for the information processing apparatus. The present invention also relates to a computer program executed by such an information processing apparatus.

2. Description of the Related Art

A portable content player including, as storage media that stores data as contents, a semiconductor storage element represented by an HD (Hard Disk) or a flash memory is widely spread. Such a portable content player can store content data as, for example, an audio file and a video file in a built-in storage medium, manage the content data, and reproduce the content data stored in this way according to, for example, predetermined reproduction operation. Sound of the content data reproduced in this way is outputted from, for example, a headphone terminal included in the portable content player as a audio signal for headphone driving. An image of the reproduced content data is displayed on, for example, a display panel included in the portable content player.

Today, services of a terrestrial digital television broadcast are started in Japan. As one of the services, a broadcast for mobile terminals such as a cellular phone called "1 seg" is also performed. Since the 1 seg adopts a digital television system, as an advantage of the 1 seg, a high image quality is stably obtained in an image of resolution that is necessary for the mobile terminals. In future, it is expected that the 1 seg will be further spread.

Under such circumstances, as a current portable apparatus and the like, for example, as represented by cellular phones in these days, combined machines having both a function of storing audio and video contents and reproducing and outputting the contents and a function of receiving a television broadcast in the 1 seg and outputting images and sound of the television broadcast to allow a user to view and listen to the images and sound are known.

As a patent document related to the technique in the past, there is JP-A-2002-152639.

SUMMARY OF THE INVENTION

It is desirable to realize unprecedented convenience and operability concerning combined machines and the like having both the function of storing and reproducing audio video contents and the function of receiving a television broadcast as described above. For this purpose, it is desirable to effectively associate both the function of storing and reproducing audio video contents and the function of receiving a television broadcast in terms of a user interface rather than simply combining the functions.

According to an embodiment of the present invention, there is provided an image processing apparatus including storing means for storing at least unit sound information equivalent to a music unit and related information associated with sound information formed from one or more related attribute items for each piece of the unit sound information, electronic-program-guide-information acquiring means for acquiring electronic program guide information having a related predetermined information item for each of programs scheduled to be broadcasted, information-content selecting means for selecting information content matching a predetermined selection condition out of information contents indicated by specific attribute items in the related information associated with sound information, and program selecting means for selecting, on the basis of a result obtained by executing processing for comparing the information content selected by the information-content selecting means and information content of the predetermined information item in the electronic program guide information, one or more programs out of the programs scheduled to be broadcasted presented by the electronic program guide information.

In the information processing apparatus, first, the unit sound information equivalent to a music unit is stored together with the related information associated with sound information, which is metadata of the unit sound information. It is possible to acquire electronic program guide information corresponding to a predetermined broadcast.

Then, after information content matching a predetermined selection condition is selected out of information contents indicated by specific attribute items in the related information associated with sound information, the selected information content and information content of the predetermined information item in the electronic program guide information are compared. On the basis of a result of the comparison, one or more programs are selected out of programs scheduled to be broadcasted presented by the electronic program guide information.

The information content selected as matching the predetermined selection condition out of the information contents indicated by the specific attribute items in the related information associated with sound information can be set as information content having a fixed or higher degree of importance for a user according to setting of the selection condition. The programs selected as a result of comparing the information content selected in this way and the information content of the predetermined information items in the electronic program guide information are programs related to the selected information content. Thus, the programs have a fixed or higher degree of importance for the user.

As described above, according to the embodiment of the present invention, it is possible to specify a program scheduled to be broadcasted having a highest degree of importance for the user on the basis of the metadata related to the unit sound information. Consequently, for example, it is possible to associate management of the unit sound information and management of content information (broadcast content information) obtained by a broadcast. Therefore, it is possible to establish a user interface having convenience and usefulness higher than those in the past.

BRIEF DESCRIPTION OF THE DRAWINGS

FIG. 3 is a diagram showing an example of the structure of an audio file associated metadata table together with an example of specific contents of the table;

FIG. 4 is a diagram showing an example of the structure of an artist list table together with an example of specific contents of the table;

FIG. 6 is a table showing an example of the structure of program unit information in an EPG together with an example of specific contents of the information;

FIG. 9 is a diagram showing an example of the structure of recording file associated metadata together with an example of specific contents of the metadata;

FIG. 10 is a diagram showing contents of the artist list table updated from the contents shown in FIG. 4 according to a result of a scheduled recording operation;

FIG. 19 is a flowchart showing an example of a processing procedure for shifting to audio file reproduction or recording file reproduction with the recording file list screen as a starting point;

FIG. 20 is a flowchart showing an example of a processing procedure for recording file reproduction responding to a recording file reproduction start request; and FIG. 21 is a flowchart showing an example of a processing procedure for shifting to audio file reproduction from a state of reproduction of a recording file according to operation.

DESCRIPTION OF THE PREFERRED EMBODIMENTS

Figure 1:
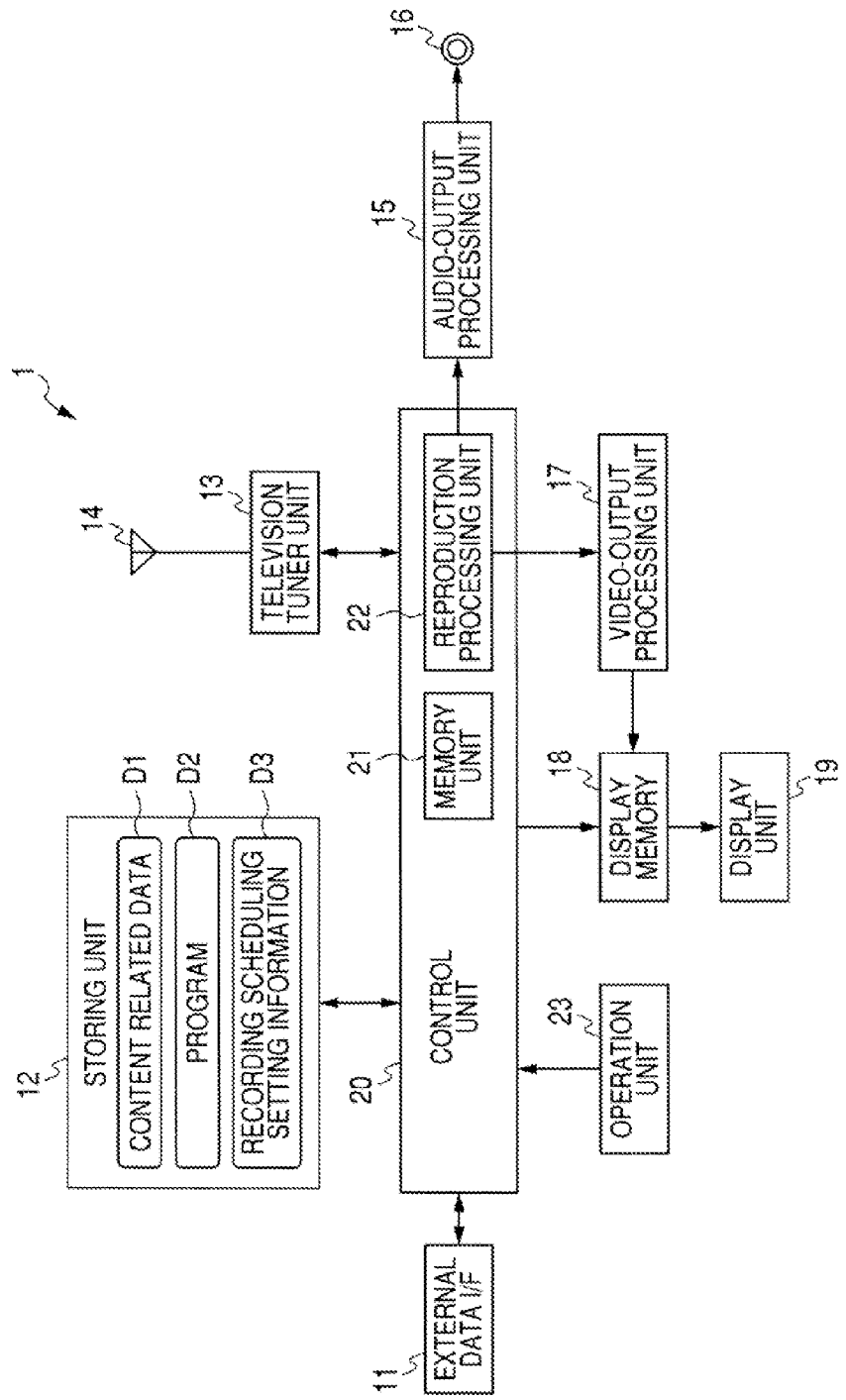
FIG. 1 is a diagram showing an example of the structure of a portable content player according to an embodiment of the present invention.

An embodiment of the present invention will be hereinafter explained in detail with reference to the accompanying drawings. In the embodiment, as an example, an information processing apparatus according to the embodiment is applied to a portable content player.

The portable content player according to this embodiment is capable of storing and managing, as audio content, data of an audio file equivalent to a music unit and is capable of reproducing and outputting the stored audio file to allow a user to listen to the audio file using headphones and the like. Further, the portable content player is capable of storing and managing, as video content, data of a video file of a predetermined format including moving images and sound synchronizing with the moving images and is capable of reproducing and outputting the video file in a form for allowing the user to view and listen to the video file.

The portable content player according to this embodiment is also capable of receiving a terrestrial digital television broadcast called 1 seg and is capable of reproducing and outputting images and sound of the terrestrial digital television broadcast to allow the user to view and listen to the images and sound. With such a 1 seg receiving function, the portable content player is capable of storing and managing, as a video file of a predetermined format, video content including information on images and sound obtained by receiving and tuning in the 1 seg. In other words, the portable content player also has a recording function for storing the video content obtained by receiving and tuning in the 1 seg. The portable content player is also capable of reproducing and outputting a video file as the stored video content of the 1 seg.

In the following explanation, among video files, a video file having video content of the 1 seg recorded therein is referred to a recording file and video files other than the recording file are referred to as general video files.

For confirmation, as it is well known, the 1 seg is one of terrestrial television broadcast services performed in Japan. The terrestrial television broadcast in Japan adopts an ISDB (Integrated Services Digital Broadcasting-Terrestrial) system. In this ISDB system, a 6 MHz band allocated to one channel is divided into thirteen segments. Under the present situation, twelve segments are used for a broadcast of HDTV called high-vision and four segments are used for SDTV of a normal image quality. One segment is reserved for a broadcast for mobile terminals. A broadcast service provided by using this one segment reserved for mobile terminals is called 1 seg.

Under the present situation, a size of a video transmitted by the 1 seg is QVGA (320×240 pixels). This specification is low in resolution compared with, for example, SDTV. However, since the 1 seg is originally a digital system, it is possible to stably obtain a sufficiently high-quality image if the image is displayed on a display panel of, for example, about 2 inches included in a mobile terminal. Since a digital broadcast is performed, in the 1 seg, it is possible to transmit a data broadcast. It is expected that characteristics of the mobile terminal are effectively utilized by taking into account content of this data broadcast.

In the 1 seg, H.264 (MPEG-4 AVC) is adopted as a video compression encoding system and AAC LC is adopted as a sound compression encoding system.

FIG. 1 shows an example of the structure of a portable content player 1 according to this embodiment.

In the structure of the portable content player 1 shown in the figure, an external data interface 11 is a functional circuit section including a hardware configuration for executing data communication conforming to a predetermined data interface standard.

The standard to which the external data interface 11 conforms is not specifically limited. Under the present situation, examples of the standard include USB (Universal Serial Bus) and IEEE1394. Besides the data interface standard by wire, it is also possible to adopt a data communication standard by short distance radio such as Bluetooth (registered trademark).

A storing unit 12 is used for mainly storing content related data D1. The content related data D1 collectively indicates audio content (including an audio file and attribute information (metadata) thereof), video content (including a general video file, a recording file, and attribute information (metadata) concerning these files), and the like.

The storing unit 12 in this case also stores data of a program D2 executed by a CPU (Central Processing Unit), which is one of sections actually forming a control unit 20. The control unit 20 reads the data of the program D2 from the storing unit 12, expands the data in an internal RAM (a memory unit 21), and executes the program D2. Consequently, a control processing operation by the control unit 20 is realized.

In this figure, recording schedule setting information D3 is shown as information stored in the storing unit 12. As described later, the portable content player 1 according to this embodiment is capable of recording, with scheduled recording, video content of a television broadcast by the 1 seg (a 1 seg broadcast). The recording schedule setting information D3 is setting information for executing the scheduled recording of the 1 seg broadcast.

A storage device actually adopted as the storing unit 12 may be any storage device as long as the storage device has so-called nonvolatility for holding data even if power supply is stopped and can easily secure a necessary storage capacity. Under the present situation, it is proper that an HD (Hard Disk), a flash memory, or the like is adopted.

A file, management information, and the like stored in the storing unit 12 are managed by a file system employing a predetermined system.

A television tuner unit 13 is provided in association with a function for receiving the 1 seg broadcast. The television tuner unit 13 receives the 1 seg broadcast and obtains at least information as broadcast content (broadcast content information: video and sound data, data broadcast data, etc.).

Therefore, the television tuner unit 13 inputs a signal obtained by receiving a broadcast radio wave of the 1 seg broadcast with an antenna 14 (a reception signal) and performs tuning processing in accordance with, for example, tuning control (channel designation) by the control unit 20 to obtain a reception signal component corresponding to a designated broadcasting station (channel). At this point, the control unit 20 executes control such that a designated channel is tuned in according to tuning operation or the like applied to an operation unit 23. The television tuner unit 13 in this case executes, concerning the reception signal component of the designated channel, demodulation processing for modulation applied during transmission from the station side and obtains baseband signals for videos and signal, respectively. In this case, video signal data and audio signal data as the baseband signals are compressed and encoded according to a predetermined system.

The control unit 20 inputs the baseband signals of the videos and sound obtained by the television tuner unit 13 as described above. As described later, signal processing for recording in the storing unit 12 or reproduction and output by images and sound is applied to the baseband signals.

An example of a form of the portable content player 1 according to this embodiment for acquiring the content data (the audio file and the video file) as the content related data D1 stored in the storing unit 12 is explained.

The audio file and the general video file in the video content of the content related data D1 are acquired from an external apparatus through the external data interface 11.

As an example, a form of acquiring the content data when the external apparatus is a personal computer is as described below.

First, the user connects the personal computer as the external apparatus to the portable content player 1 to allow the personal computer and the portable content player 1 to communicate with each other through the external data interface 11.

In the personal computer, for example, application software for storing and managing audio files and video files (general video files) is installed. When the portable content player 1 and the personal computer are connected, this application software is activated. The user operates the application software to arbitrarily select files out of the audio files and the video files stored and managed by this application software. The selected file is transferred to the portable content player 1 by communication through the external data interface 11. When the application software transfers the audio file and the video file to the portable content player 1 in this way, metadata corresponding to the audio file and the video file, respectively, is also transferred together with these transfer files.

The control unit 20 of the portable content player 1 acquires the audio file, the video file, and the metadata transferred and received through the external data interface 11 as described above. The control unit 20 converts this data into a predetermined format according to necessity and, then, transfers and writes the data in the storing unit 12 to cause the storing unit 12 to store the data.

The video content as the recording file of the content related data D1 is based on information of videos and sound as video content acquired by receiving the 1 seg broadcast in the television tuner unit 13.

The control unit 20 performs processing for converting video signal data and audio signal data of a baseband signal format, which are obtained by reception and tuning and demodulation processing of the television tuner unit 13, into a file format and, then, transfers the data to the storing unit 12 to cause the storing unit 12 to store the data. A file recorded in this way is managed as a recording file. For confirmation, this recording file also includes data of the video content of the 1 seg broadcast converted into a file and stored. The control unit 20 creates a metadata file in association with each of recording files stored in the storing unit 12 and causes the storing unit 12 to store this metadata file as well.

A block structure for reproducing and outputting the content data stored in the storing unit 12 is explained with reference to FIG. 1.

When an audio file of the content data stored in the storing unit 12 is reproduced, first, the control unit 20 reads out an audio file designated as a reproduction object from the storing unit 12. The control unit 20 inputs data of the read-out audio file, i.e., audio signal data to a reproduction processing unit 22 provided in the control unit 20 itself and executes reproduction signal processing in the reproduction processing unit 22.

The reproduction processing unit 22 is a section adapted to be capable of executing necessary reproduction signal processing for audio signal data and video signal data as audio content and video content.

As the reproduction signal processing in this case, first, the control unit 20 applies decoding (expansion processing) corresponding to a compression encoding format of the inputted audio signal data to the audio signal data to obtain a digital audio signal with a predetermined sampling frequency and a quantized bit. The control unit 20 causes the reproduction processing unit 22 to input this digital audio signal to an audio-output processing unit 15.

The audio-output processing unit 15 in this case applies necessary signal processing such as sound quality adjustment and volume adjustment, processing for conversion into an analog audio signal (A/D conversion), and amplification to the inputted digital audio signal and outputs the digital audio signal to a headphone terminal 16 as a audio signal for headphone driving. Consequently, the user can listen to reproduced sound of the audio file with headphones connected to the headphone terminal 16.

In general, the headphones are applicable to two channels by L (left) and R (right) stereos or multi-channels including the number of channels larger than two channels. Therefore, in practice, the portable content player 1 according to this embodiment has a structure applicable to the predetermined channel structure of two or more channels described above as a sound reproduction signal processing system (an audio reproduction processing system of the reproduction processing unit 22 and the audio-output processing unit 15). However, here, for convenience of simplified illustration and explanation, these channels are collectively shown as one system.

When a video file (a general video file or a recording file) in the content data is reproduced, the control unit 20 executes readout of a necessary video file from the storing unit 12 and outputs the video file to the reproduction processing unit 22.

As it is understood from the above explanation, the video file includes at least video signal data as moving images and audio signal data that should be reproduced and outputted in synchronization with the video signal data. The video signal data and the audio signal data are formed in a compressed and encoded format. Thus, the reproduction processing unit 22 in this case applies decoding (expansion) processing corresponding to compression encoding systems of the video signal data and the audio signal data of the inputted video file to the video signal data and the audio signal data, respectively, to obtain a digital video signal of a predetermined format and a digital audio signal, a reproduction time of which synchronizes with that of the digital video signal. The reproduction processing unit 22 outputs the digital video signal to a video output processing unit 17 and outputs the digital audio signal to the audio-output processing unit 15.

The video output processing unit 17 applies image quality adjustment, processing for conversion into frame image data for display, and the like to the inputted digital video signal according to necessity. The video output processing unit 17 writes the frame image data for display in a display memory 18 one after another at predetermined timing corresponding to a frame period.

A display unit 19 includes a display device of a predetermined system and a drive circuit that drives the display device. The display device is driven by the frame image data written in the display memory 18 as described above. Consequently, a reproduced image (a moving image) of the video file is displayed on a display panel as the display unit 19.

At the same time, the audio-output processing unit 15 applies signal processing same as that explained above to the inputted digital audio signal and outputs the digital audio signal from the headphone terminal 16 as a audio signal for headphone driving. The user of the portable content player 1 according to this embodiment can view and listen to the reproduced image and the reproduced sound of the video content by listening to the reproduced sound with the headphones while viewing the display panel of a main body of the portable content player 1.

As a basic 1 seg associated function, the portable content player 1 according to this embodiment is also capable of outputting the video content, which is obtained by receiving and tuning in and demodulating the 1 seg broadcast with the television tuner unit 13, as images and sound on a real time basis.

For this purpose, the portable content player 1 only has to input the video signal data and the audio signal data in the baseband format as the video content, which is obtained by demodulating the 1 seg broadcast in the television tuner unit 13, to the reproduction processing unit 22, execute decoding processing corresponding to the compression encoding systems of the respective data, and cause the video output processing unit 17 and the audio-output processing unit 15 to output the video signal data and the audio signal data as outputs after demodulation, respectively. Thereafter, the video output processing unit 17, the display memory 18, the display unit 19, and the audio-output processing unit 15 execute operations same as those during video file reproduction described above. In this way, the user can view and listen to images and sound of the 1 seg broadcast currently being received and tuned in with the display panel and the headphones.

In the digital television broadcast, as it is well known, it is possible to multiplex and transmit data of a data broadcast, data of a closed caption broadcast, and the like together with a main broadcast (information of videos and sound as video content). It is also possible to transmit data of an EPG (Electronic Program Guide) (EPG data) including information concerning programs scheduled to be broadcasted.

The portable content player 1 according to this embodiment is also applicable to the data broadcast, the closed caption broadcast, reception of the EPG data, and decoding and output of the EPG data.

For example, the portable content player 1 receives the data broadcast, the closed caption broadcast, or the EPG data with the television tuner unit 13 and acquires data of the data broadcast, closed caption data, or the EPG data. In this case, the control unit 20 captures the data.

The control unit 20 executes, concerning the data of the data broadcast, decode processing corresponding to a data format of the data. In this case, when the data of the data broadcast is display data, the control unit 20 creates display image data from the data for the data broadcast after the decode processing and writes the display image data in the display memory 18. Consequently, for example, images of the data broadcast are displayed on a display screen of the display unit 19. When the data for the data broadcast is, for example, control data for a two-way service, the control unit 20 executes processing corresponding to this control data.

When the data for the closed caption broadcast is received and acquired, the control unit 20 inputs and decode this data. The decoded closed caption data is, for example, text data whose predetermined maximum number of characters is defined. The control unit 20 interprets this text data to create display image data such that a caption is displayed in a predetermined position together with a main image (e.g., a video content image of the 1 seg broadcast) and writes the display image data in the display memory 18. As a result, an image including the main image and the caption is displayed on the display screen of the display unit 19.

When the EPG data is received and acquired, for example, after arranging the EPG data in a predetermined format, the control unit 20 writes and stores the EPG data in the memory unit 21. The memory unit 21 includes a storage device such as a DRAM or an SDRAM. Besides the EPG data, various kinds of information and data that the control unit 20 (the CPU)

should use are stored therein. The CPU loads a program to the memory unit 21 and executes the program and uses the memory unit 21 as a work area of the CPU.

For example, when the EPG data should be displayed on the display unit 19 according to user operation or the like, the control unit 20 reads out the EPG data stored in the memory 21, creates display image data as a program list reflecting content of the EPG data, and writes the display image data in the display memory 18.

In this embodiment, as described later, automatic scheduled recording of the 1 seg broadcast linked to metadata of an audio file is possible. In performing the automatic scheduled recording, the EPG data is used.

For example, in practice, the control unit 20 mainly includes a microcomputer system including a CPU, a RAM (the memory unit 21), and a ROM as hardware. The control unit 20 executes control processing in the portable content player 1.

Various operators included in the portable content player 1 and a section that generates and outputs a signal (an operation signal) corresponding to operation applied to these operators are collectively shown as the operation unit 23. The control unit 20 executes necessary control processing according to the operation signal inputted from the operation unit 23.

Figure 2:
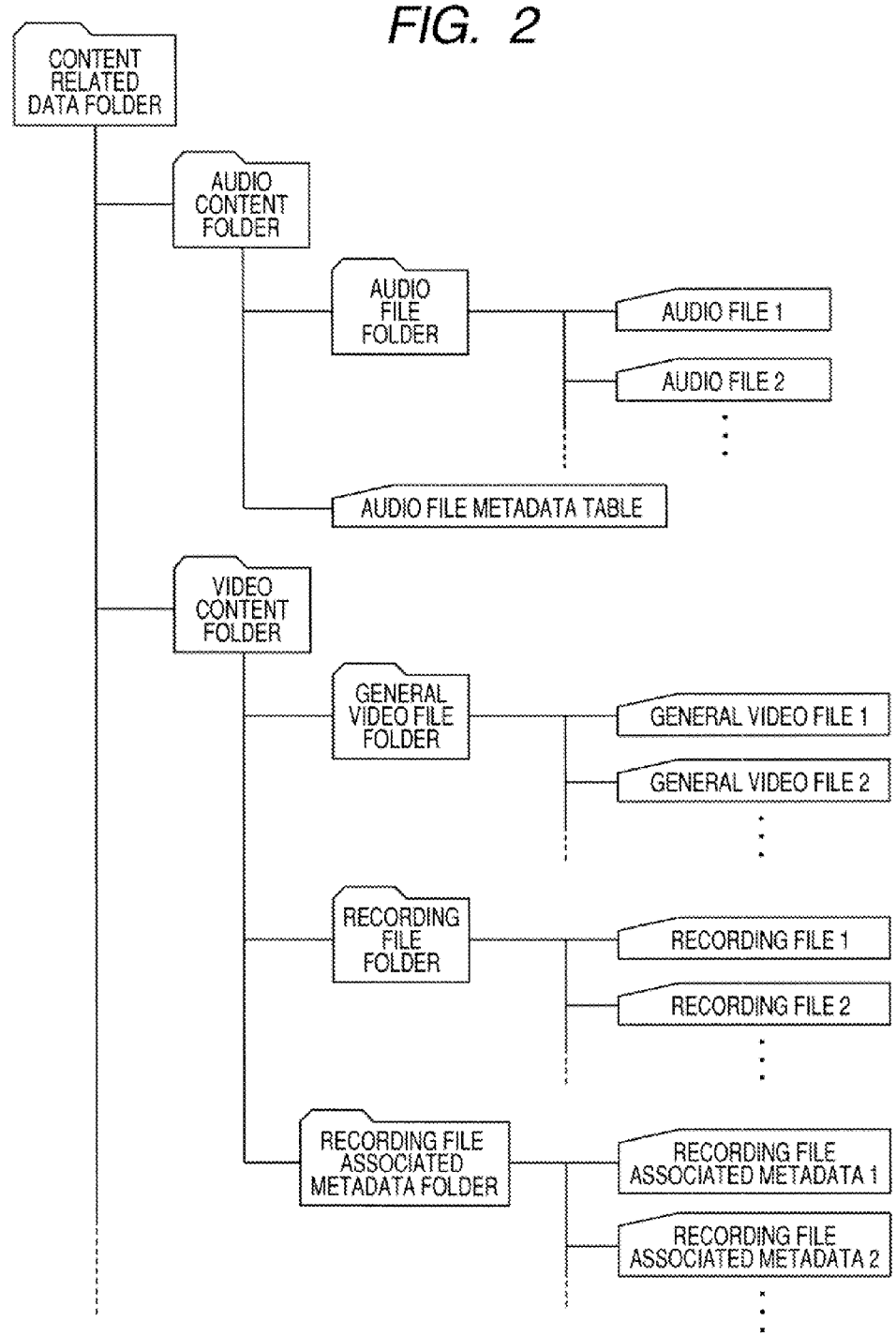
FIG. 2 is diagram showing an example of contents of content data stored in the portable content player according to the embodiment together with an example of a directory structure of the content.

The content related data D1 among the data stored in the storing unit 12 is explained with reference to FIG. 2. In FIG. 2, various kinds of information belonging to the content related data D1, details of files, and examples of management forms of the files are shown in a directory structure. In other words, the content related data D1 stored in the storing unit 12 is managed using a directory structure defined, for example, as shown in FIG. 2 under a predetermined file system.

A content related data folder is placed in a directory of a top-level layer in FIG. 2. This content related data folder is placed in a predetermined directory layer in a volume as the storing unit 12.

Right below the content related data folder, an audio content folder and a video content folder are placed.

In a directory right below the audio content folder, an audio file folder and an audio file metadata table are placed.

In the audio file folder, one or more audio files are stored as indicated by audio file 1, an audio file 2, and the like in the figure. For confirmation, the audio files are acquired by the portable content player 1 from the external apparatus with data communication through the external data interface 11, for example, as explained above.

The audio file metadata table is a table of predetermined metadata (additional information and attribute information) concerning the audio files stored in the audio file folder. An example of content of attribute items and an example of the structure of the audio file metadata table are described later. The audio file metadata table in this case is managed as one file unit by, for example, a file system.

In a directory right below the video content folder, three folders, i.e., a general video file folder, a recording file folder, and a recording file associated metadata folder are placed.

In the general video file folder, one or more general video files are stored as indicated by general video files 1, 2, and the like in the figure.

In the recording file folder, one or more recording files are stored as indicated by recording files 1, 2, and the like in the figure.

In the recording file associated metadata folder, one or more recording file associated metadata are stored as indicated by recording file associated metadata 1, 2, and the like in the figure.

The respective recording file associated metadata correspond to the recording files stored in the recording file folder in a one to one relation. Therefore, recording file associated metadata in the number same as that of the recording files stored in the recording file folder are stored in the recording file associated metadata folder. For example, in FIG. 2, the recording file associated metadata 1, 2, and the like correspond to the recording files 1, 2, and the like, respectively. The respective recording file associated metadata have contents representing predetermined attributes concerning the recording files corresponding thereto.

Contents of information types and examples of management forms belonging to the content related data D1 are not limited to those shown in the figure.

For example, in practice, metadata may be prepared in association with the general video files (general video file associated metadata). A directory (a folder) in which the general video file associated metadata may be placed in the video content folder.

For example, it is also possible to include, as content data, still image files as photographs and the like together with the audio files and the video files. Thus, in such a case, a still image file folder is additionally placed in, for example, a layer right below the content related data folder. The still image file only has to be stored in this still image file folder.

FIG. 3 shows an example of the structure of the audio file metadata table (related information associated with sound information), which is stored in the audio content folder in FIG. 2, together with an example of contents of the information.

In the audio file metadata table shown in the figure, first, information of a music title, an artist name, an artist ID, and a file associated rating point (importance information) is associated with one audio file ID as attribute items to form a table list corresponding to one audio file. Then, such a table list is arrayed in association with each of the audio files stored in the audio folder.

The audio file ID is an identifier attached to be peculiar to each of the audio files. The music title indicates a title of music for the audio file corresponding thereto. The artist name indicates a name of an artist who plays the music as the corresponding audio file. The artist ID is an identifier allocated to be peculiar to each of artist names. In this case, the artist ID and the artist name correspond to each other in a one to one relation and, as a result, indicate an identical object. However, the artist ID is used for internal processing such as retrieval of the artist name and the artist name is used in presenting the artist name to the user through a UI (User Interface) such as display.

The file associated rating point is attached to each of the audio files. A higher rating point of the file associated rating point indicates that a degree of importance (a degree of preference) for the user concerning music as an audio file corresponding thereto is higher.

For example, in a management application for audio content running on the external apparatus as a transfer source of the audio file or the portable content player 1 according to this embodiment, degrees of importance in the number of ranks set in advance are set for music as audio files stored and managed by the management application or the portable content player 1. The degrees of importance once set can be changed. The degrees of importance set in this way are indicated by the numbers of symbols such as stars corresponding to the set degrees of importance on, for example, a GUI screen formed by the management application or a screen of the portable content player 1. The file associated rating points are the set degrees of importance represented by numerical values as rating points. Concerning a method of giving the rating points, for example, when the degrees of importance are set in five ranks, fixed values only have to be integrated in such a manner as 1, 2, 3, 4, and 5, 5, 10, 15, 20, and 25, or 10, 20, 30, 40, and 50 from a lowest degree of importance to a highest degree of importance.

An example of specific contents of information of respective attribute items of the audio file metadata table shown in FIG. 3 is explained. As audio file IDs, M01, M02, M03, M04, M05, and M06 are arrayed. This indicates that there are six audio files in total and, therefore, the six audio files are stored in the audio file folder.

In a table list of the audio file indicated by the audio file ID=M01 (equivalent to one row in which an attribute item corresponding to one audio file in a table structure in the figure is arrayed), a music title=ABCD, an artist name=artist A, an artist ID=A01, and a file associated rating point=10 are shown.

In an audio file of the audio file ID=M02, a music title=EFGH, an artist name=artist A, an artist ID=A01, and a file associated rating point=20 are shown.

In an audio file of the audio file ID=M03, a music title=IJKL, an artist name=artist A, an artist ID=A01, and a file associated rating point=0 are shown.

In an audio file of the audio file ID=M04, a music title=MNOP, an artist name=artist B, an artist ID=A02, and a file associated rating point=20 are shown.

In an audio file of the audio file ID=M05, a music title=QRST, an artist name=artist C, an artist ID=A03, and a file associated rating point=10 are shown.

In an audio file of the audio file ID=M06, a music title=UVWX, an artist name=artist C, an artist ID=A03, and a file associated rating point=0 are shown.

New registration of the audio files in the audio file metadata table is performed when transfer of the audio files is received from, for example, an audio file management application running on the external apparatus through the external data interface 11 and the audio files are stored in the storing unit 12.

In other words, the audio file management application manages the audio files as music in association with various metadata such as attribute items shown in the audio file metadata table in FIG. 3. When an audio file as audio content is transferred from the audio file management application to the portable content player 1 and stored therein, at least information of an audio file ID, a music title, an artist name, an artist ID, and a file associated rating point necessary for creating the audio file metadata table in FIG. 3 is also transferred as attribute information concerning the audio file to be transferred. The portable content player 1 creates a new table list using these pieces of information received together with the audio file and additionally registers the table list in the audio file metadata table.

When setting for changing a rating (a degree of importance) for music (an audio file) is performed by, for example, operation on the portable content player 1, a value of the file associated rating point corresponding to the audio file in the audio file metadata table is rewritten.

The portable content player 1 according to this embodiment creates an artist list table using the audio file metadata table and a recording file associated metadata of content described later and store the artist list table in a storage area of the memory unit 21 or the like.

An example of a structure form and contents of an artist list is shown in FIG. 4. The contents of the artist list shown in FIG. 4 are created using the audio file metadata table of the contents shown in FIG. 3.

As shown in FIG. 4, an artist list table is formed such that, for one table list, an artist name, an artist associated rating point, an associated audio file, and an associated recording file are associated with an artist ID. In other words, the artist list table is information formed by arraying, with artists as bases, attribute items corresponding to each of the artists.

The artist ID of the artist list table in this case is acquired by retrieving an artist ID registered in the audio file metadata table. In the audio file metadata table in FIG. 3, there are six audio files in total and there are three artist IDs, A01 (artist A), A02 (artist B), and A03 (artist C). Three table lists corresponding to the artist IDs A01, A02, and A03 are created in FIG. 4.

In the table list of the artist ID=A01, an artist name=artist A, an artist associated rating point=10, associated audio files=M01, M02, and M03, and an associated recording file=none are shown.

The artist name=artist A in this table list is obtained by retrieving an artist name corresponding to the artist ID=A01 from the audio file metadata table in FIG. 3.

The artist associated rating point (sub-information on a degree of importance) is a rating point representing a degree of importance of each of artists for the user. A larger value of the artist associated rating point indicates a higher degree of importance. A method of obtaining a value of the artist associated rating point is described later.

The associated audio file indicates a list of audio files having the artist ID (the artist name) of the table list as an attribute. In the table of the artist ID=A01 in FIG. 4, audio file IDs=M01, M02, and M03 are shown as associated audio files.

This list is obtained by retrieving an audio file ID of a list table having content of the artist ID=A01 from the audio file metadata table in FIG. 3.

The associated recording file indicates a list of recording files having the artist ID of the table list as an attribute. The table list of the artist ID=A01 in FIG. 4 indicates that a corresponding recording file is not present, i.e., a recording file having the artist ID=A01 (artist A) as an attribute is currently not stored in the storing unit 12.

An example of a procedure for registering the associated recording file is described later.

The artist associated rating point is a rating point representing a degree of importance of each of artists for the user. A larger value of the artist associated rating point indicates a higher degree of importance.

As explained above, it is possible to set the file associated rating point associated with the audio file according to operation on the audio file management application running on the external apparatus and the portable content player 1. However, in this embodiment, a value of the artist associated rating point is automatically calculated rather than being calculated by user operation.

For example, the artist associated rating point corresponding to the table list of the artist ID=A01 is 10. This is calculated by an algorithm described below.

In FIG. 3, audio files having the artist ID=A01 as an attribute are audio files of the audio file IDs=M01, M02, and M03. An average of rating points of these audio files is calculated as (10+20+0)/3=10. The average calculated in this way is set as an artist associated rating point in the table list of the artist ID=A01.

In other words, the artist associated ratting point is, from the audio file metadata table, an average of file associated rating points of all table lists having a common artist ID (artist name) as an attribute item.

The artist associated rating point may be set by user operation in the same manner as the setting of the file associated rating point. In other words, the user needs to set the artist associated rating point in addition to the file associated rating point. It is likely that, depending on a user, this makes operation complicated and confuses the user. Thus, in this embodiment, taking into account such a problem, the artist associated rating point can be automatically set by, for example, the procedure and the algorithm described above rather than user setting.

Various other procedures and algorithms for automatically setting the artist associated rating points are conceivable. However, this point is described later.

In FIG. 4, in a table list of the artist ID=A02 following an artist ID=A01, an artist name=artist B, an artist associated rating point=20, an associated audio file=M04, and an associated recording file=none are shown.

In the audio file metadata table in FIG. 3, an artist name corresponding to the artist ID=A02 is artist B. Since an audio file having the artist ID=A02 as an attribute is only an audio file of the audio file ID=M04, the associated audio file=M04. Since a file associated rating point in this table list is 20, the artist associated rating point=20. It is indicated that, as in the above case, an associated recording file is currently not present (not stored in the storing unit 12).

In a table list of the artist ID=A03, an artist name=artist C, an artist associated rating point=5, associated audio files=M05 and M06, and an associated recording file=none are shown.

In the audio file metadata table in FIG. 3, an artist name corresponding to the artist ID=A03 is artist C. Audio files having the artist ID=A03 as an attribute are two audio files of audio file IDs=M05 and M06. Thus, audio file IDs M05 and M06 are stored in the associated audio file. As file associated rating points in the table lists of these audio files, 10 and 0 are stored, respectively. Thus, the artist associated rating point=5 (=(10+0)/2). In the associated recording file, as in the above case, a recording file is not stored in this case. Therefore, it is indicated that a recording file is currently not present (not stored in the storing unit 12).

Since the portable content player 1 according to this embodiment has the table information such as the audio file metadata table and the artist list table, the portable content player 1 manages audio files as audio contents.

Figure 5:
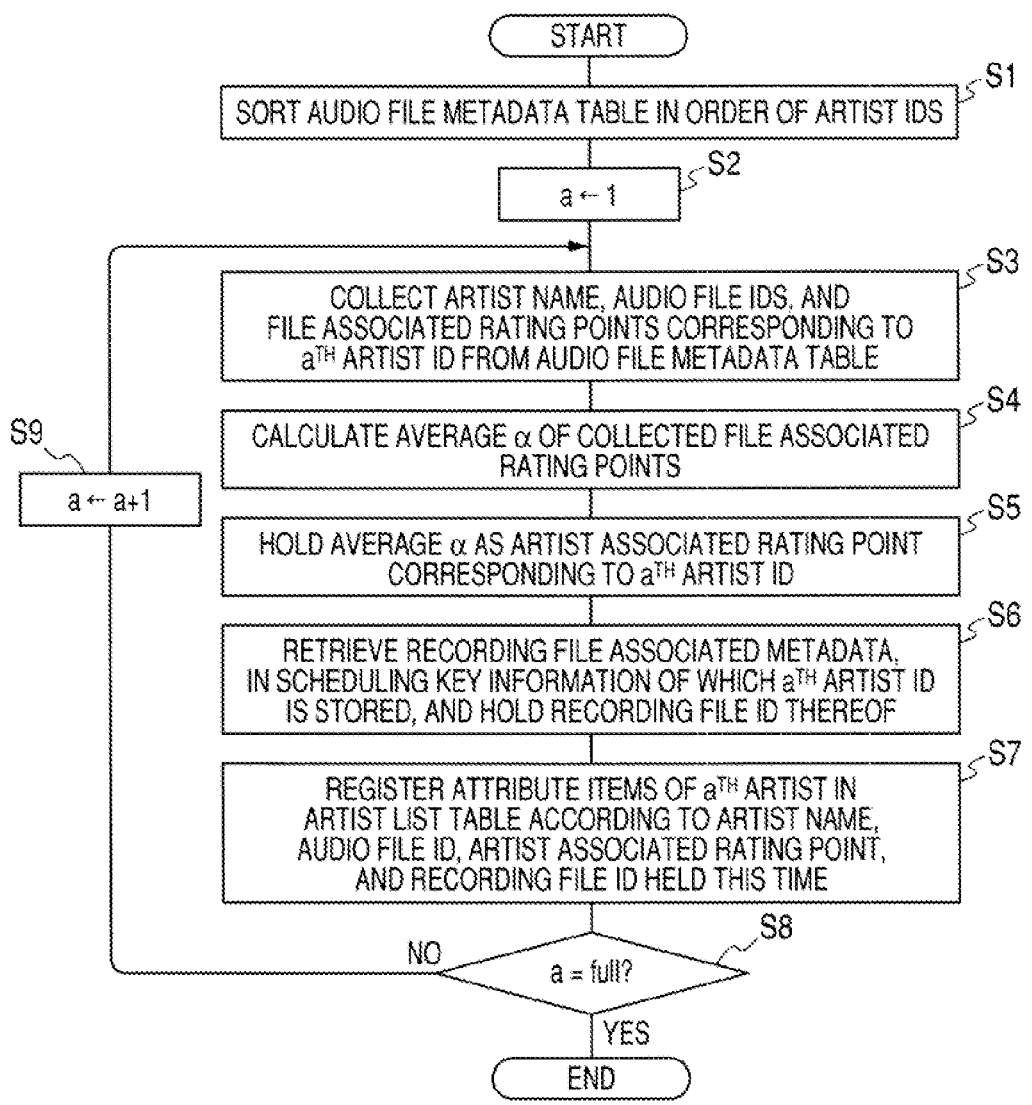
FIG. 5 is a flowchart showing an example of a processing procedure for creating the artist list table.

A flowchart in FIG. 5 indicates an example of a processing procedure for creating the artist list table shown in FIG. 4.

The procedure shown in the figure can be regarded as being realized, for example, when the CPU as the hardware configuration section of the control unit 20 in FIG. 1 loads and executes the program (D2) stored in the storing unit 12. The same holds true for respective flowcharts (FIGS. 7, 8, and 13 to 21) explained below.

For example, when the portable content player 1 according to this embodiment is activated, in a process of predetermined activation process, a procedure for creating an artist list table according to FIG. 5 is executed.

In FIG. 5 in this case, first, in step S1, the control unit 20 reads the audio file metadata table stored in the storing unit 12 and, then, sorts the audio file metadata table in order of artist IDs in list table units. This sort makes it easy to perform, for example, retrieval of information items for creation of an artist list table after that. For example, in the audio file metadata table in FIG. 3, the artist IDs are arrayed in order of A01, A01, A01, A02, A03, and A03 from the top to the bottom. This is the same as a state in which list tables are sorted in order of the artist IDs.

In step S2, the control unit 20 substitutes 1 in a variable "a" indicating processing order of the artist IDs and shifts to procedures in step S3 and subsequent steps.

In step S3, the control unit 20 refers to list tables of all audio files corresponding to an "a"th artist ID from the audio file metadata table. For example, in the audio file metadata table in FIG. 3, details of the artist IDs of the six table lists are A01, A01, A01, A02, A03, and A03. Thus, as content classifications of the artist IDs, there are three artist IDs, A01, A02, and A03. Here, when processing of the respective artist IDs is performed in order of A01, A02, and A03, in the case of the variable "a"=1, processing for the artist ID=A01 is performed. Thus, the control unit 20 refers to the table lists of the audio file IDs=M01, M02, and M03.

In step S3, first, the control unit 20 specifies contents of artist names from the table list referred to and collects contents of audio file IDs and file associated rating points from the respective tables. The control unit 20 holds contents of attribute items "artist name", "audio file ID", and "file associated rating point".

In step S4, the control unit 20 calculates an average α of values (rating points) collected as file associated rating points among the attribute items collected in step S3. In step S5, the control unit 20 holds the average α as an artist associated rating point corresponding to the "a"th artist ID.

In step S6, the control unit 20 sequentially accesses recording file associated metadata managed as being stored in the recording file associated metadata folder in the storing unit 12. The control unit 20 refers to scheduling key information, which is one of information items of the accessed recording file associated metadata, for each of the recording file associated metadata. In the explanations heretofore, the structure of recording file associated metadata is not explained. This is explained later with reference to FIG. 9.

As explained below with reference to FIG. 9, when data is stored in an item of scheduling key information, a recording file to which recording file associated metadata of the data corresponds is obtained by recording a 1 seg broadcast with an automatic scheduled recording operation. A type of the data stored in the scheduling key information is an artist ID. In determining a program that should be automatically scheduled-recorded, this artist ID is used as information indicating, with an ID, an artist name functioning as a factor for the determination (a keyword).

In step S6, the control unit 20 retrieves, with reference to scheduling key information of the recording file associated metadata to which the control unit 20 sequentially accessed, recording file associated metadata in which the "a"th artist ID is stored. When the "a"th artist ID is stored, the control unit 20 reads and holds a recording file ID that the recording file associated metadata has as an information item.

In step S7, the control unit 20 creates a table list corresponding to the "a"th artist ID using the artist name, the audio file ID, the artist associated rating point (the average α), and the recording file ID, which are held by the processing in steps S3 to S6 executed this time in association with the "a"th artist ID, and registers the table list in the artist list table.

In other words, in the table list in the artist list table, as explained with reference to FIG. 4, the respective attribute items "artist name", "artist associated rating point", "associated audio file", and "associated recording file" are associated with one artist ID. Thus, concerning the attribute item "artist name", the content of the artist name held in step S3 is stored. Concerning the attribute item "artist associated rating point", the value of the artist associated rating point (the average α) held in step S5 is stored. Concerning the attribute item "associated audio file", the audio file ID stored in held S3 is stored. Concerning the attribute item "associated recording file", the recording file ID held in step S6 is stored. In this way, a table list corresponding to the "a"th artist ID is created. The control unit 20 additionally registers the table list in the artist list table.

In step S8, the control unit 20 judges whether the present variable "a" is a maximum value (a=full). The maximum value of the variable "a" is the number of content classifications concerning the artist ID (the artist name) indicated in the audio file list. In the example in FIG. 3, the maximum number of the variable "a" is 3.

When a negative judgment result is obtained in step S8, since there is an artist ID for which the processing has not been completed, the control unit 20 increments the variable "a" in step S9 and returns to step S3. Consequently, the processing is sequentially applied to the next artist ID and a created table list is registered in the artist list table.

When the processing has been completed for all the artist list IDs, an affirmative judgment result is obtained in step S8 and the control unit 20 finishes the processing shown in FIG. 5. At this stage, table lists concerning all the artist list IDs indicated in the audio file metadata table are registered in the artist list table. In other words, the artist list table is stored in the memory unit 21 in a completed state.

On the basis of the above explanation, automatic scheduled recording of a 1 seg broadcast in the portable content player 1 according to this embodiment is explained.

In the 1 seg broadcast, as a normal program or the like, data of an EPG (Electronic Program Guide) (EPG data) is multiplexed and broadcasted together with information on videos and sound. As it is well known, the EPG data is data, which is called an electronic program guide or the like, used for displaying a program list on a screen. The EPG data has various kinds of necessary information concerning programs scheduled to be broadcasted. In the 1 seg broadcast under the present situation, for each of channels, EPG data having information concerning a predetermined number of (e.g., about ten) programs scheduled to be broadcasted after the present point is transmitted in the channel (broadcasting station).

The portable content player 1 according to this embodiment has a function of receiving and acquiring the EPG data as a 1 seg broadcast receiving function.

For example, when the EPG data is multiplexed on a reception signal of a channel currently tuned in by the television tuner unit 13, the television tuner unit 13 extracts and acquires the multiplexed EPG data and transfers the EPG data to, for example, the control unit 20. The control unit 20 stores the transferred EPG data in the memory unit 21.

The EPG data stored in the memory unit 21 is used for, for example, first, displaying the program list as the EPG (Electronic Program Guide) on the display screen of the display unit 19. When the automatic scheduled recording according to this embodiment is performed, the EPG data is used for specifying a program to be scheduled-recorded.

When it is taken into account that the EPG data is used as described above, it is preferable to acquire and store EPG data corresponding to as many channels as possible among channels (broadcasting stations) that can be received in the 1 seg broadcast. Thus, the portable content player 1 according to this embodiment executes a background operation described below according to predetermined execution timing and execution opportunities under a state in which the 1 seg broadcast is received and not reproduced and outputted as images and sound on a real time basis because, for example, content stored in the storing unit 12 is being reproduced or, in particular, the portable content player 1 is in a state in which videos and sound of content are not outputted.

The portable content player 1 sequentially tunes in all channels of the 1 seg broadcast using the television tuner unit 13 and executes processing for storing EPG data broadcasted in the respective channels in the memory unit 21. As described above, since this operation is performed on the background, reproduction and output of images and sound of a channel received and tuned in is not performed.

By adopting such a procedure for acquiring EPG data, at a stage when all the channels in the 1 seg broadcast are selected and tuned in, EPG data for all the channels can be stored. If such processing for acquiring EPG data at every fixed timing in association with, for example, an update period of the EPG data on a broadcast side, EPG data of latest contents can typically be stored for all the channels of the 1 seg broadcast.

As a specific example of contents of EPG data multiplexed for the 1 seg broadcast and received, acquired, and stored by the portable content player 1, content corresponding to a certain broadcast scheduled program is shown in FIG. 6. A portion forming EPG data corresponding to one program is referred to as program unit information in an EPG.

The program unit information in an EPG shown in FIG. 6 includes, as information items corresponding to the one program, a broadcasting station name, a genre, a program title, a start date and time, an end date and time, and program content.

The broadcasting station name indicates a name of a broadcasting station that broadcasts the program. In this example, the broadcasting station name indicates "Television Nippon". The genre indicates a genre of content of the program. In this example, the genre indicates "music". The program title indicates a name of the program. In this example, the program title is "Our Music". The start date and time and the end date and time indicate start and end dates and times of broadcast of the program. In this example, the start date and time is "2006/9/15 (Fri) 23:00" and the end date and time is "2006/9/15 (Fri) 23:58".

In the program content, content as a comment on the program, an abstract of the program, and the like is described. In this example, an abstract of content of the program, names of cast, and the like are described as, for example, "Total Collection of Musical Masterpieces, Cast: Artist A, Artist C".

Figure 7:
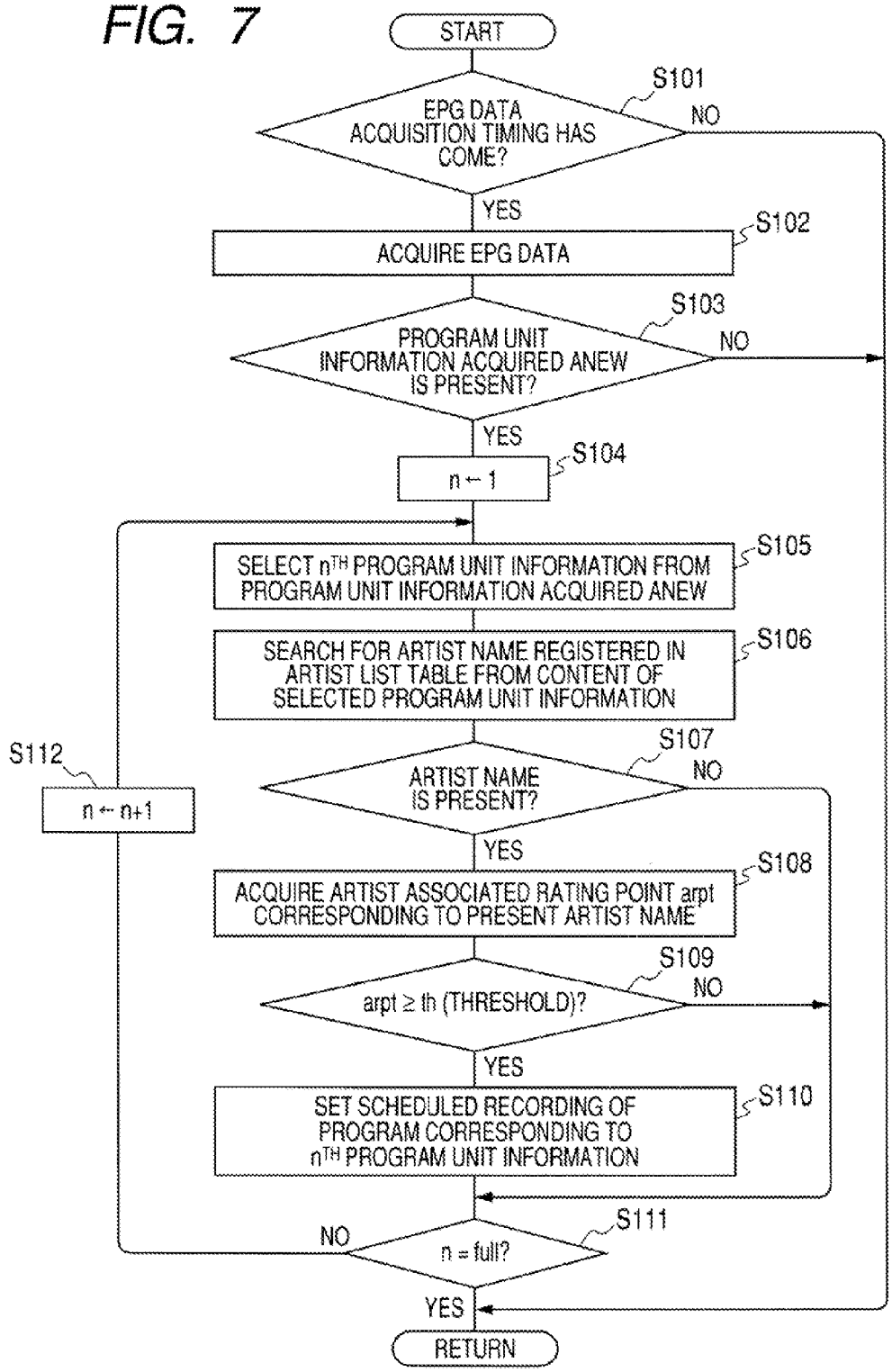
FIG. 7 is a flowchart showing an example of a processing procedure for automatic scheduled recording setting.

A flowchart in FIG. 7 shows an example of a processing procedure for setting automatic scheduled recording according to this embodiment. As it is understood from the above explanation, in the setting of automatic scheduled recording according to this embodiment, in specifying a program to be recorded, the EPG data and the management information (the audio file metadata table and the artist list table) concerning audio files are used.

First, in step S101, the control unit 20 waits for timing for acquiring EPG data to come. When it is judged that the timing has come, in step S102, the control unit 20 acquires EPG data. In processing for acquiring EPG data, as explained above, the control unit 20 acquires, while sequentially receiving and tuning in all channels of the 1 seg broadcast, EPG data in each of the channels and causes the memory unit 21 to store the EPG data.

In step S103, the control unit 20 judges whether, as a result of the acquisition of the EPG data in step S102, program unit information in an EPG acquired (stored) anew is present. When it is judged that program unit information in an EPG acquired anew is not present, i.e., the EPG data acquired in step S102 has content same as that of EPG data acquired before the processing for acquiring EPG data, the control unit 20 leaves the processing shown in the figure and returns to, for example, step S101.

On the other hand, when it is judged that program unit information in an EPG acquired anew is present and an affirmative judgment result is obtained, the control unit 20 proceeds to a procedure in step S104 and subsequent steps. Program unit information in an EPG acquired anew is present when, for example, according to the actual finish of broadcast of one program, concerning EPG data transmitted by a broadcasting station side, program unit information in an EPG of the finished program (i.e., a program broadcasted at an earliest broadcast time in the program unit information in an EPG) is deleted and, instead, program unit information in an EPG of a program broadcasted at a latest broadcast time is added anew.

In step S104, the control unit 20 substitutes 1 in a variable "n". The variable "n" indicates a serial number (processing order) affixed to each of one or more pieces of program unit information in an EPG to be processed, i.e., the program unit information in an EPG acquired anew in step S102.

In step S105, the control unit 20 selects nth program unit information in an EPG in the processing order out of the program unit information in an EPG acquired anew in step S102 this time. In step S106, the control unit 20 searches for an artist name registered in the artist list table from content of the program unit information in an EPG selected in S105.

Specifically, information items of program content are present in the program unit information in an EPG as shown in FIG. 6. In step S105, the control unit 20 searches for information on a character string coinciding with an artist name registered in the artist list table from description data representing program content stored in the information items of program content, i.e., performs processing for comparing character strings. For example, when step S105 is executed with the example of the artist list table in FIG. 4 as a premise, as artist names in the artist list table in FIG. 4, there are three artist names, i.e., "artist A, "artist B", and "artist C". Thus, in step S105, in the program content of the program unit information in an EPG selected as the nth program unit information in an EPG, a character string coinciding with any one of "artist A", "artist B", and "artist C" is searched.

For example, as possibility, it is conceivable that an artist name is included in a program title. Thus, the control unit 20 also searches through a program title in the program unit information in an EPG in step S105.

In step S107, the control unit 20 judges whether, as a result of the search in step S106, the artist names registered in the artist list table is present in the selected nth program unit information in an EPG. When it is judged that none of the artist names registered in the artist list table is present in the selected nth program unit information in an EPG and a negative judgment result is obtained, the control unit 20 skips a procedure in step S108 and subsequent steps and proceeds to step S111. On the other hand, when it is judged that at least one of the artist names registered in the artist list table is present in the nth program unit information in an EPG and an affirmative judgment result is obtained, the control unit 20 proceeds to step S108.

In step S108, the control unit 20 recognizes, with reference to the artist list table, an artist associated rating point arpt corresponding to the artist name judged as being present in the nth program unit information in an EPG in step S107. For example, when "artist A" among the artist names "artist A", "artist B", and "artist C" shown in FIG. 4 is present, since the artist associated rating point arpt associated with "artist A" is 10, the artist associated rating point arpt recognized in step S108 is also 10.

It is also likely that it is judged in step S107 that plural artist names are present as a result of the search. In such a case, in step S108, the control unit 20 recognizes an artist associated rating point arpt of each of the artist names judged as being present.

In step S109, the control unit 20 judges whether a relation arpt≥th holds concerning the artist associated rating point arpt recognized in step S108 and a threshold th set in advance. When a negative judgment result is obtained, the control unit 20 skips step S110 and proceeds to step S111. When an affirmative judgment result is obtained, the control unit 20 proceeds to step S110.

The control unit 20 proceeds to step S111 when the relation arpt≥th holds. This means that a degree of importance, i.e., a degree of interest or a degree of preference of the user concerning the artist name recognized in step S108 this time is equal to or higher than a fixed degree. Therefore, it can be considered that a program whose an artist name judged as having a high degree of importance for the user is present in the program unit information in an EPG is a program having a high degree of importance for the user and is worth viewing.

Thus, in this embodiment, in step S110, the control unit 20 executes processing for performing scheduled recording setting for a program to which the nth program unit information in an EPG corresponds.

For this purpose, the control unit 20 collects information necessary for the scheduled recording setting with reference to the nth program unit information in an EPG. For example, the control unit 20 specifies a channel number to be tuned in with reference to the broadcasting station name and determines a recording start time and a recording end time with reference to the start date and time and the end date and time. In particular, in the case of this embodiment, the control unit 20 stores, as information necessary for the scheduled recording setting, an artist ID corresponding to the artist name having the artist associated rating point arpt for which the affirmative judgment result is obtained in step S109. For example, when the artist name corresponding to the artist associated rating point arpt for which the affirmative judgment result is obtained in step S109 is the artist A in the artist list table in FIG. 3, the control unit 20 prepares the artist ID A01 of the artist A as information necessary for the scheduled recording setting. The information of the artist ID is referred to as scheduling key information because the information indicates the artist name as a factor (a key) for determining that the scheduled recording setting should be applied to a program corresponding to the nth program unit information in an EPG being processed this time.

The control unit 20 creates recording schedule setting information per one program using the information of the channel number, the recording start time, the recording end time, the scheduling key information (the artist ID), transfers the recording schedule setting information to the storing unit 12, and stores the recording schedule setting information in a storage area (a directory) allocated for the recording schedule setting information D3.

In step S111, the control unit 20 judges whether the present variable "n" is a maximum value (n=full). The maximum value is a total number of pieces of program unit information in an EPG acquired anew in step S102 this time.

When a negative judgment result is obtained in step S111, among the pieces of program unit information in an EPG acquired anew, unprocessed program unit information in an EPG still remains. Thus, in step S112, the control unit 20 increments the variable "n" (n←n+1) and, then, returns to step S105. On the other hand, when an affirmative judgment result is obtained in step S111 because the processing is applied to all the pieces of program unit information in an EPG acquired anew, the control unit 20 leaves the processing shown in the figure.

The flow of the automatic scheduled recording setting in the portable content player 1 according to this embodiment explained above is summarized as described below.

In this embodiment, first, in the management of the audio file as the audio content, the file associated rating point is defined as one of attribute information of the audio file. In other words, in music units for each of audio files, a value indicating a degree of importance (a degree of preference) of the audio file can be set according to user operation. Then, in this embodiment, a value indicating a degree of importance of each of artists (artist IDs and artist names) is calculated using the file associated rating point and this value is included in the one piece of attribute information as an artist rating point.

In setting for automatic program recording scheduling of the 1 seg broadcast, when a broadcast program that should be automatically scheduled-recorded is selected, with reference to content of EPG data for the same 1 seg broadcast, a program related to an artist having a fixed or higher artist rating point is set as a selection condition. In other words, in this embodiment, selection of a recording object program in the setting for automatic program recording scheduling of a television broadcast is performed on the basis of preference of the user concerning artists in a category of audio contents stored in the portable content player 1.

In this way, the automatic program scheduled recording of the 1 seg broadcast is associated with the artists of the audio contents. Consequently, when the user simply performs setting of a rating point for music (an audio file) as normal operation for audio content management, as an operation of the portable content player 1, a program of the 1 seg broadcast related to an artist having a high degree of importance for the user is automatically scheduled-recorded at a high probability. In other words, for the user, even if the user does not apply designation operation concerning program scheduled recording to the 1 seg broadcast itself, a program worth viewing for the user is automatically recorded. Therefore, convenience higher than that in the past is obtained.

For example, in the past, as an automatic program scheduled recording function, a recording object program is selected by reflecting preference of the user on the selection. However, this automatic program scheduled recording function is a function of setting a selection condition on the basis of a key word such as a genre or a name of an actor inputted by a user and specifying a program matching this selection condition with reference to, for example, EPG data. In other words, the user in this case needs to apply designation operation concerning program scheduled recording to a television broadcast itself. In this regard, it can be said that convenience is further improved in this embodiment.

In practice, the scheduled recording setting that is possible in the portable content player 1 according to this embodiment is not limited to the automatic setting explained above. The scheduled recording setting may be, for example, manual setting generally performed that involves operation for an image of an EPG.

Figure 8:
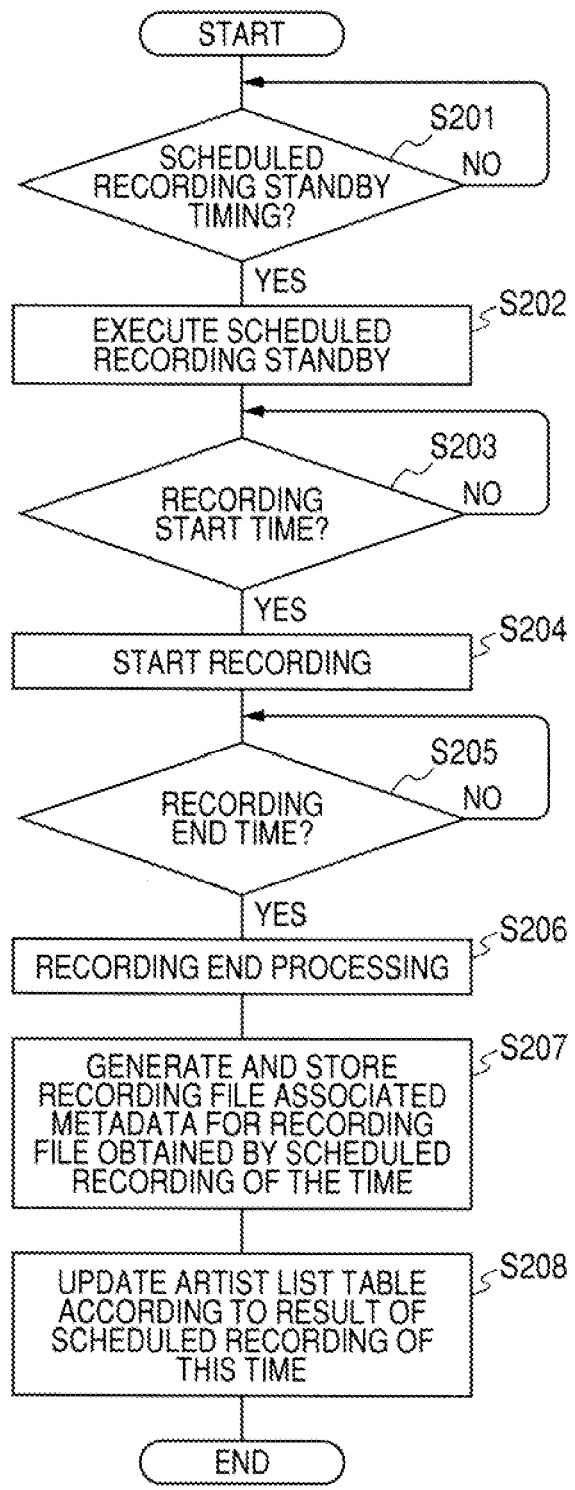
FIG. 8 is a flowchart showing an example of a processing procedure for executing scheduled recording.

An example of a processing procedure for executing an operation as scheduled recording is explained with reference to FIG. 8.

First, in step S201, the control unit 20 waits for scheduled recording standby timing to come. The scheduled recording standby timing means timing a predetermined time (e.g., several seconds) before a recording start time indicated by recording schedule setting information. When it is judged that the scheduled recording standby timing has come, the control unit 20 proceeds to a procedure in step S202.

In step S202, the control unit 20 sets a scheduled recording standby mode. First, the control unit 20 sets, in the television tuner unit 13, an operation for receiving and tuning in a channel indicated by the recording schedule setting information having the recording start time that determines the scheduled recording standby timing. The control unit 20 sets an operation of a system for recording a signal outputted from the television tuner unit 13 in, for example, the storing unit 12 as a recording file to be effective.

In step S203, the control unit 20 waits for the recording start time indicated by the recording schedule setting information to come. When it is judged that the recording start time has come, the control unit 20 starts a recording operation according to a procedure in step S204.

In step S205, the control unit 20 waits for the recording end time indicated by the recording schedule setting information to come. When it is judged that the recording end time has come, the control unit 20 executes scheduled recording finish processing in step S206. As the scheduled recording finish processing, for example, first, the control unit 20 updates the file system such that data of content of the 1 seg broadcast stored in the storing unit 12 by the present recording operation is managed as one recording file. When necessary, the control unit 20 stops the reception and tuning-in operation of the television tuner unit 13 that has been performed, an operation of a recording signal processing system, and the like.

Subsequently, in this embodiment, the control unit 20 executes processing in steps S207 and S208. Steps S207 and S208 may be regarded as being included in the finish processing in step S206. However, since steps S207 and S208 are characteristic processing in this embodiment, steps S207 and S208 are shown separately from step S206.

As described above, one recording file is additionally obtained when the present scheduled recording is finished. However, in step S207, the control unit 20 creates recording file associated metadata corresponding to the recording file obtained by the present scheduled recording and causes the storing unit 12 to store the recording file associated metadata.

An example of content of the recording file associated metadata created in step S207 is shown in FIG. 9.

As shown in the figure, the recording file associated metadata belonging to one recording file is formed by information items "recording file ID", "broadcasting station name", "genre", "program title", "start date and time", "end date and time", "program content", and "scheduling key information".

The recording file ID is an identifier given to be peculiar to each of recording files stored in a recording file folder. For example, every time a recording file is created and stored anew, an identifier not overlapping a recording file already stored is created according to a predetermined rule and is set as a recording file ID. Here, for convenience of explanation, V01 is attached as the recording file ID.

The broadcasting station name, the genre, the program title, the start date and time, the end date and time, and the program content are information related to a program that is a source of a recording file corresponding thereto. These kinds of information are created using program unit information in an EPG concerning the program that is the source of the recording file.

When the corresponding recording file is stored by automatic recording scheduling, an artist ID of an artist name that is a factor for determining the recording file as an object of the automatic recording scheduling is stored in the scheduling key information. As explained above, an artist ID can be stored in the recording schedule setting information as a scheduling key information. The artist ID as the scheduling key information in the recording file associated metadata in this case is created by, for example, copying an artist ID stored in the scheduling key information in the recording schedule setting information of the corresponding recording file.

When the recording file associated metadata is created and stored in the storing unit 12 as described above, subsequently, in step S208, the control unit 20 updates the artist list table according to a result of the present scheduled recording.

For example, as explained above with reference to FIG. 4, the item "associated recording file" is provided in the artist list table. The associated recording file indicates, with a recording file ID, a list of recording files having an artist ID of the same table list as an attribute. This means that "a recording file ID indicated by the recording file associated metadata that stores the artist ID of the table list as scheduling key information is stored in the associated recording file".

When the present scheduled recording operation is executed as a result of the automatic scheduled recording, the artist ID is stored in the scheduling key information of the recording file associated metadata created in step S207. Therefore, in this case, the recording file ID of the recording file associated metadata created in step S207 should be stored in an associated recording file of a table list of an artist list table to which the artist ID indicated by the scheduling key information of the recording file associated metadata corresponds. In step S208, the control unit 20 executes processing for updating such an artist list table.

As a specific example, when the recording file associated metadata shown in FIG. 9 is created in step S207 as explained above, the artist ID=A01 indicating the artist A is stored in the scheduling key information. Therefore, in step S208, the control unit 20 updates the artist list table to store the recording file ID=V01 in an associated recording file of a table list of the artist ID=A01 (the artist A) as shown as transition from FIG. 4 to FIG. 10.

The artist list table is originally management information related to audio content. However, as in step S207, by registering the associated recording file in the artist list table according to a recording result, in this embodiment, the audio content and the recording file are associated with respect to an artist after the scheduled recording.

An example of a user interface used when contents (an audio file and a recording file) stored in the storing unit 12 are reproduced and outputted in the portable content player 1 according to this embodiment is explained with reference to FIGS. 11 and 12. FIGS. 11 and 12 show, together with an example of an operation procedure, an interface screen, a reproduction screen, and the like displayed on a display screen unit 19A of a display unit 19 concerning content reproduction. An example of display content shown in FIGS. 11 and 12 is on the premise that the display content is the storage content of the content file of the storing unit 12 described above as an example as shown in FIGS. 3, 9, and 10. It is assumed that, as the audio content, the six audio files indicated by the audio file IDs=M01, M02, M03, M04, M05, and M06 are stored and, as the recording file, one recording file (the recording file ID=V01) obtained by recording the program corresponding to the program unit information in an EPG shown in FIG. 6 is stored.

Figure 11A:
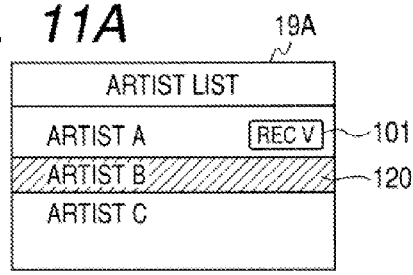
FIGS. 11A to 11F are diagrams for explaining, using display forms in a display screen unit, an example of an operation procedure for shifting to audio file reproduction or recording file reproduction with the display of an artist list as a starting point.

When an instruction for displaying an artist list screen (one of information content list images) as one of user interface screens concerning the audio content is given by, for example, predetermined operation of the user on the operation unit 23, an artist list screen of a form shown in FIG. 11A is displayed on the display screen unit 19A. The artist list screen displays all artist names of the audio content (the audio file) stored in the storing unit 12 as a list. In the case of FIG. 11A, the artist list screen corresponds to storage content of the audio file indicated by the audio file metadata table shown in FIG. 3. List items representing the respective artist names "artist A", "artist B", and "artist C" are shown.

In the list item of the artist A in this case, a recording file icon 101 (indication of a broadcast content information presence notice) is arranged and displayed. The recording file icon 101 has the significance of notifying that a recording file related to an artist shown in the list item, in which the recording file icon 101 is arranged and displayed, is present. According to the above specific explanation, with the artist A as the recording key information, the program of the title "Our Music" is scheduled-recorded and the program is stored in the storing unit 12 as the recording file of the recording file ID=V01 by the flow explained with reference to FIGS. 6 to 10. The recording file icon 101 in FIG. 11A is displayed because this recording file is stored.

A cursor 120 is arranged on the artist list screen to highlight any one list item selected out of the list items. In this figure, an example of a state in which the cursor 120 is arranged in the list item of the artist B is shown. The cursor 120 sequentially moves among the list items according to predetermined operation on the operation unit 23.

Figure 11B:
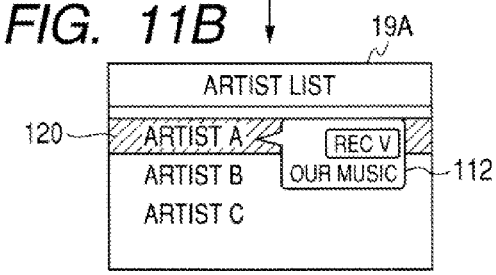

In a state in which the artist list screen shown in FIG. 11A is displayed, for example, when the user performs operation for moving the cursor 120 to the list item of the artist A, the artist list screen changes as shown in FIG. 11B according to the operation.

The cursor 120 moves to the list item of the artist A in response to the operation. The recording file icon 101 is arranged in the list item of the artist A. When the cursor 120 is located in the list item, in which the recording file icon 101 is arranged, in which way, as shown in the figure, a video title list window 112 is displayed with, for example, the section of the recording file icon 101 enlarged.

The video title list window 112 is a pop-up window that presents a list of recording files related to an artist of a list item in which the video title list window 112 is arranged using program titles of the recording files. As described above, one recording file of the program of the title "Our Music" is stored in relation to the artist A. Thus, one list item in which the program title "Our Music" of this recording file is shown is displayed on the video title list window 112 in FIG. 11B.

Figure 11C:
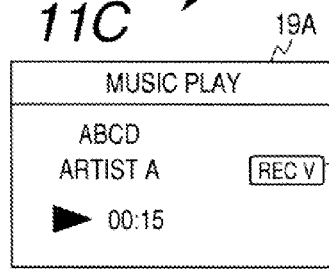

With such an artist list screen as a starting point, first, as shown as a flow from FIG. 11B to FIG. 11C, it is possible to shift to reproduction of the audio content with a normal audio reproduction function of the portable content player 1.

Under a state in which the artist list screen shown in FIG. 11B is displayed, for example, when the user performs operation for determination of selection, although not shown in the figure, an audio title list that shows audio content of the artist A, on which the cursor 120 is arranged, using a music title of the audio content is displayed. When the user selects an arbitrary music title from this audio title list and performs determination operation, reproduction of an audio file of the music title selected and determined (music play) is started. As the reproduction of the audio file is started in this way, a music play screen shown in FIG. 11C is displayed on the display screen unit 19A.

The music play screen in FIG. 11C indicates that a title of the audio file (music) being currently reproduced is "ABCD" and an artist name is artist A. In addition, an icon indicating a reproduction operation state, a reproduction time, and the like are displayed on the music play screen. Moreover, in this embodiment, the recording file icon 101 is displayed as shown in the figure.

The recording file icon 101 displayed on the music play screen indicates that a recording file related to the artist of the audio file being reproduced is stored in the storing unit 12. In other words, when the recording file icon 101 is not displayed on the music play screen, this indicates that a recording file related to the artist of the audio file being reproduced is not stored in the storing unit 12.

In this embodiment, as indicated as a flow from FIG. 11B to FIG. 11E, it is also possible to shift to reproduction of a recording file related to the artist presented on the artist list screen with the artist list screen as a starting point.

As operation for the shift, for example, the user selects an arbitrary one of list items (program titles) of recording files displayed in the video title list window 112 displayed as shown in FIG. 11B and performs determination operation. In the example in FIG. 11B, only one list item of a recording file of the program title "Our Music" is displayed in the video title list window 112. Thus, an object of the selection and determination operation is inevitably the program title "Our Music".

Figure 11E:
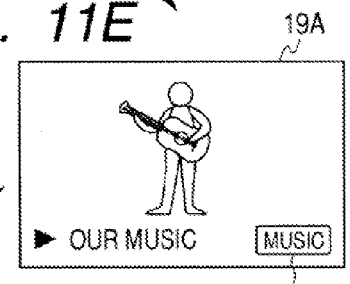

When the selection and determination are actually performed for the program title "Our Music", as shown in FIG. 11E, a moving image obtained by reproducing the recording file of the program title "Our Music" is displayed on the display screen unit 19A. In other words, a video play screen is displayed. On the video play screen in the figure, an icon indicating a reproduction operation state and a program title are displayed together with a reproduced moving image of the recording file.

Moreover, in this embodiment, as shown in the figure, an audio file icon 102 is displayed.

The audio file icon 102 (indication of a unit sound information presence notice) indicates that audio content (an audio file) of an artist related to the recording file, the reproduced moving image of which is being displayed, is stored in the storing unit 12.

As it is seen from FIG. 11C and FIG. 11E, in this embodiment, on the music play screen displayed according to reproduction of an audio file, it is notified that there is a recording file related to an artist of the audio file. Conversely, on the video play screen displayed according to reproduction of a recording file, it is notified that there is an audio file related to an artist of the recording file.

Moreover, in this embodiment, it is possible to perform shift from the audio file reproduction to the recording file reproduction and opposite shift from the recording file reproduction to the audio file reproduction with the recording file icon 101 and the audio file icon 102 displayed for the notification as starting points.

Figure 11D:
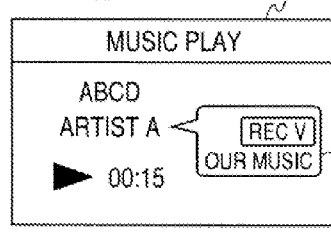

First, in a state in which the music play screen is displayed as shown in FIG. 11C, when the user performs operation equivalent to click on the recording file icon 101, the video title list window 112 is displayed on the music play screen as shown as transition to FIG. 11D. In the video title list window 112 in the case of the music play screen, a list of recording files related to an artist of music (an audio file) being currently played is displayed. Therefore, in the list of recording files in this case, one list item indicating the program title "Our Music" is displayed as a recording file related to the artist A. The user selects arbitrary one list item out of list items presented in the video title list window 112 and performs determination operation. In a state shown in FIG. 11D, the user performs selection and determination for the list item of the program title "Our Music". According to this operation, reproduction of the audio file is switched to reproduction of the recording file selected and determined. According to the switch of the reproduction, the display screen unit 19A is switched to display of the reproduced moving image of the recording file of the program title "Our Music" as indicated as transition from FIG. 11D to FIG. 11E.

Figure 11F:
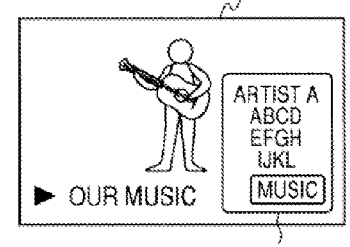

When the user performs operation equivalent to click on the audio file icon 102 on the video play screen shown in FIG. 11E, as indicated as transition to FIG. 11F, an audio title list window 113 is displayed on the video play screen.

The audio title list window 113 is a pop-up window that presents a list of music (audio files) of an artist related to a recording file currently being reproduced using music titles of the music. In the case of FIG. 11F, a music list of the artist A is presented. For example, when the user selects arbitrary one list item out of list items of music presented in the window 113 and performs determination operation, play of the music selected and determined is started. For example, when the user performs selection and determination for a list item with a music title "ABCD" in the audio title list window 113 shown in FIG. 11F, reproduction of an audio file of this music is started. On the display screen unit 19A, as indicated as transition from FIG. 11F to FIG. 11C, a music play screen for the music title "ABCD" is displayed.

Figure 12A:
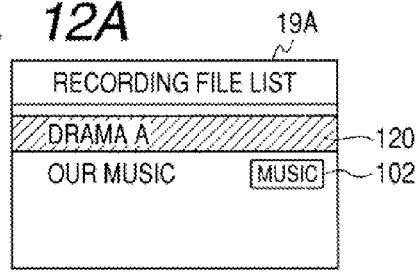
FIGS. 12A to 12F are diagrams for explaining, using display forms in the display screen unit, an example of an operation procedure for shifting to audio file reproduction or recording file reproduction with the display of a recording file list as a starting point.

For example, when an instruction for displaying a recording file list is given by predetermined operation of the user on the operation unit 23, a recording file list of a form shown in FIG. 12A is displayed on the display screen unit 19A. The recording file list presents a list of recording files stored in the storing unit 12 using program titles of the recording files. In this case, since the recording files stored in the storing unit 12 are two program titles "drama A" and "Our Music", two list items "drama A" and "Our Music" are displayed in the recording file list in FIG. 12A according to the program titles.

Among the recording files presented as the list items of the recording file list, in recording files associated with an artist, the audio file icon 102 is arranged and displayed. This indicates that audio files of the artist associated with the recording files are stored. In FIG. 12A, the audio file icon 102 is arranged in the list item "Our Music". This is based on the fact that the audio file (see FIG. 3) of the artist A associated with the program title "Our Music" is stored in the storing unit 12. For example, the recording file of "drama A" is normally recorded rather than, for example, being scheduled-recorded. An artist and the like are not specifically registered in scheduling key information of the recording file associated metadata.

In the recording file list, the cursor 120 is arranged to highlight one table list selected. In the figure, the cursor 120 is arranged in the list item "drama A".

Figure 12B:
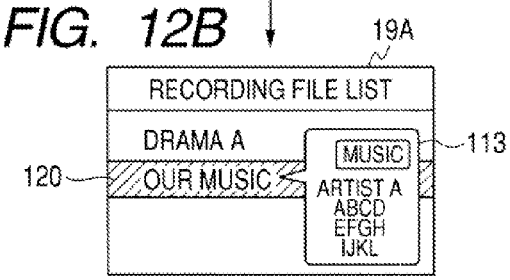

In a state in which a recording file list shown in FIG. 12A is displayed, for example, the user performs operation for moving the cursor 120 to the list item of the artist A. Then, on the recording file list, as shown in FIG. 12B, first, the cursor 120 moves to the list item "Our Music". Simultaneously with the movement of the cursor 120, the audio title list window 113 is displayed with, for example, the section of the audio file icon 102 enlarged.

The audio title list window 113 is a pop-up window that presents a list of audio files of an artist related to a recording file of a list item in which the audio title list window 113 is arranged using music titles of the audio files.

Figure 12C:
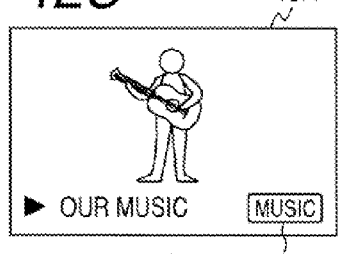

In a state in which the cursor 120 is arranged in the list item of the music title "Our Music" as shown in FIG. 12B, the user performs operation for selection and determination. Then, the portable content player 1 starts reproduction of the recording file of the program title "Our Music". According to the start of reproduction, the display screen unit 19A is switched to a video play screen that displays a reproduced moving image of the recording file of "Our Music" as shown in FIG. 12C. The video play screen for "Our Music" is the same as that shown in FIG. 11E.

Figure 12E:

In a display state shown in FIG. 12B, the user selects, with predetermined operation, one list item from a title list of music presented in the audio title list window 113 and performs determination operation. Then, reproduction of an audio file of music selected and determined is started. According to the start of reproduction, the display screen unit 19A is switched to a music play screen for the reproduced audio file as shown in FIG. 12E. In FIG. 12E, since a list item of a music title "ABCD" is selected and determined from the audio title list window 113, a music play screen for the music title "ABCD" is shown. The music play screen in FIG. 12E is the same as that shown in FIG. 11C.

Figure 12D:

In a state in which the video play screen is displayed as shown in FIG. 12C, as explained as the transition from FIG. 11E to FIG. 11F and from FIG. 11F to FIG. 11C, according to operation equivalent to click on the audio file icon 102, the audio title list window 113 can be displayed as shown in FIG. 12D. Moreover, as shown as transition from FIG. 12D to FIG. 12E, according to selection and determination operation for a title list of audio files in the audio title list window 113, the video play screen can be switched to audio file reproduction.

Figure 12F:
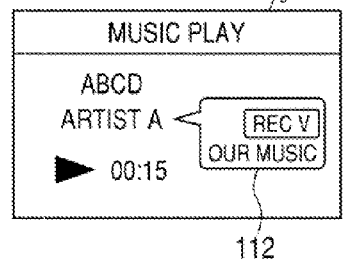

In a state in which the music play screen is displayed as shown in FIG. 12E, as explained as the transition from FIG. 11C to FIG. 11D and from FIG. 11D to FIG. 11E, according to operation equivalent to click on the video file icon 101, the video title list window 112 can be displayed as shown in FIG. 12F. Moreover, as shown as transition from FIG. 12F to FIG. 12C, according to selection and determination operation for a title list of audio files in the video title list window 112, audio file reproduction can be switched to recording file reproduction.

As it is understood from the explanation with reference to FIGS. 11 and 12, in this embodiment, audio file reproduction can be shifted to recording file (i.e., file of a video format) reproduction with, for example, the artist list screen as an interface screen originally used for audio file reproduction as a starting point. During reproduction of an audio file, in a state in which a screen showing a reproduction state (a music play screen) is displayed, as in the state described above, audio file reproduction can be shifted to recording file reproduction.

Conversely, recording file reproduction can be shifted to audio file reproduction with the recording file list screen as an interface screen used for recording file reproduction as a starting point. During reproduction of a recording file, in a state in which a video play screen showing a reproduction state is displayed, recording file reproduction can be shifted to audio file reproduction.

In this embodiment, it is possible to start video file reproduction without performing a large number of operation procedures for returning from the interface screen related to audio file reproduction to the interface screen related to video file reproduction. Conversely, it is also possible to start audio file reproduction without returning from the interface screen related to recording file (video file) reproduction to the interface screen related to audio file reproduction. Consequently, for example, the user can perform operation related to reproduction of a content file in a seamless sense without clearly distinguishing audio from video. Thus, it is possible to obtain unprecedented satisfactory operability.

An example of a processing procedure executed by the control unit 20 (the CPU) in order to realize the user interface related to content reproduction shown in FIGS. 11 and 12 is explained with reference to flowcharts in FIGS. 13 to 21.

Figure 13:
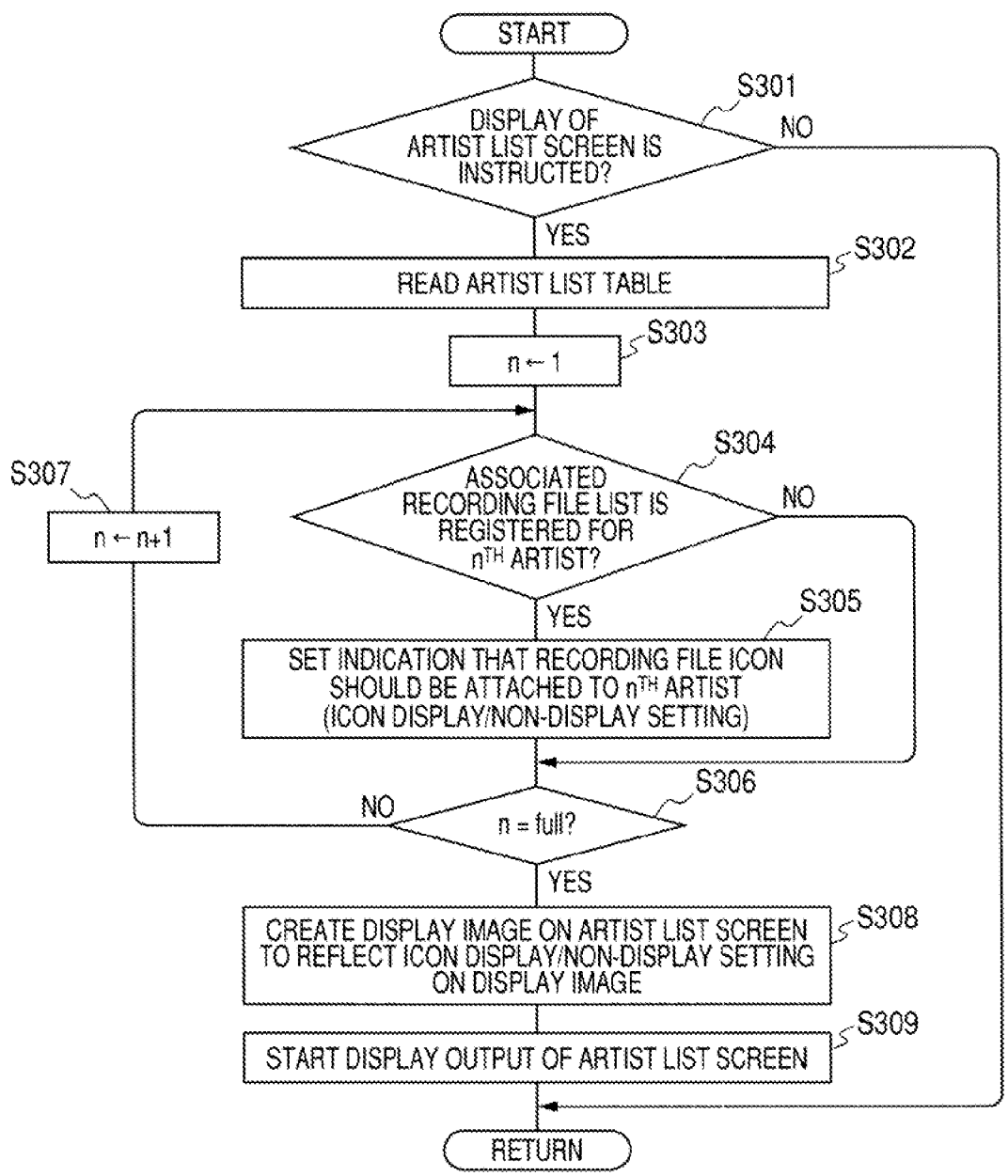
FIG. 13 is a flowchart showing an example of a processing procedure for displaying and outputting an artist list screen.

An example of a processing procedure related to display of the artist list screen shown in FIGS. 11A and 11B is explained with reference to the flowchart in FIG. 13.

First, in step S301, the control unit 20 waits for an instruction for displaying the artist list screen to be obtained. When an instruction for displaying the artist list screen is obtained according to, for example, operation on the operation unit 23 for displaying the artist list screen, the control unit 20 proceeds to a procedure in step S302 and subsequent steps.

In step S302, the control unit 20 reads, for example, an artist list table stored in the memory unit 21. In step S303, the control unit 20 executes initialization for substituting 1 in a variable "n". The variable "n" in this case indicates processing order for processing after that set for artists registered in the artist list table.

In step S304, the control unit 20 judges whether, concerning an nth artist in the artists shown in the artist list table read in step S302, at least one recording file ID is registered in an associated recording file that is one of attribute items of the artist list table.

When an affirmative judgment result is obtained, the control unit 20 proceeds to step S305. In step S305, the control unit 20 sets an indication that the present nth artist should be displayed on the artist list screen with the recording file icon 101 attached thereto. The control unit 20 proceeds to step S306.

On the other hand, when a negative judgment result is obtained in step S304, the control unit 20 skips step S305 and proceeds to step S306. In this case, the control unit 20 sets an indication that the nth artist is not displayed with the recording file icon 101 attached thereto. According to the procedure from steps S304 to S306, display/non-display of the recording file icon corresponding to the nth artist is set.

In step S306, the control unit 20 judges whether the present variable "n" is a maximum value (full). When a negative judgment result is obtained, there is an artist for which processing concerning recording file icon display/non-display setting is not performed. Thus, the control unit 20 increments the variable "n" in step S307 and, then, returns to step S304 and performs recording file icon display/non-display setting for the next artist. On the other hand, according to completion of recording file icon display/non-display setting for all the artists, when an affirmative judgment result is obtained in step S306, the control unit 20 proceeds to step S308.

In step S308, the control unit 20 creates display image data for the artist list screen to reflect, on the display image data, a setting result of recording file icon display/non-display set for each of the artists by the procedure performed so far. In step S309, the control unit 20 transfers this display image data to the display memory 18 and causes the display unit 19 to display an image of the display image data. In other words, the control unit 20 causes the display unit 19 to start display of the artist list screen.

An example of a processing procedure for shifting to audio file reproduction or recording file reproduction with the artist list screen as a starting point as explained with reference to FIGS. 11A to 11F is explained with reference to the flowchart in FIG. 14.

First, in step S401, the control unit 20 judges whether operation for moving the cursor 120 on the artist list screen currently being displayed is applied to the operation unit 23. When a negative judgment result is obtained, the control unit 20 proceeds to step S405 described later. On the other hand, when an affirmative judgment result is obtained, the control unit 20 proceeds to step S402.

In step S402, the control unit 20 moves the cursor 120 to a position of a list item of another artist and displays the cursor 120 in accordance with a moving direction and a moving amount corresponding to a cursor moving instruction issued in step S401. At this point, when the video title list window 112 is displayed in the list item arranged in the cursor 120 before the movement of the cursor 120, the control unit 20 erases the video title list window 112 according to the present movement of the cursor 120.

In step S403, the control unit 20 judges whether the recording file icon 101 is displayed in the list item in which the cursor 120 is arranged by the present cursor movement. When a negative judgment result is obtained, the control unit 20 returns to step S401. On the other hand, when an affirmative judgment result is obtained, the control unit 20 proceeds to step S404.

In step S404, the control unit 20 creates, with reference to the artist list table stored in the memory unit 21, display image data of a video title list window of an artist indicated by the list item in which the cursor 120 is currently arranged (a selection object artist). The control unit 20 executes display control processing such that the display image data is displayed in a superimposing manner on the artist list screen in, for example, the display form shown in FIG. 11B.

In step S405, the control unit 20 judges whether selection and determination operation for a video title is performed as operation for the video title list window 112 currently being displayed. When the cursor 120 is arranged in a list item in which the recording file icon 101 is not displayed such as a list item corresponding to the artist B in FIGS. 11A and 11B, the video title list window 112 is not displayed. In this case, in step S405, the control unit 20 outputs a negative judgment result.

When an affirmative judgment result is obtained in step S405, the control unit 20 proceeds to step S406. In step S406, the control unit 20 outputs a request for start of reproduction of a recording file corresponding to the video title selected and determined in step S405 and leaves the processing shown in the figure. A flow of this processing corresponds to the transition from FIG. 11B to FIG. 11E.

On the other hand, when a negative judgment result is obtained in step S405, in step S407, the control unit 20 judges whether operation for invoking display of another list screen or the like other than the artist list screen currently displayed. When such operation is not performed, the control unit 20 returns to step S401.

On the other hand, when it is judged that operation for instructing invoking of another screen is performed and an affirmative judgment result is obtained in step S407, the control unit 20 proceeds to step S408. In step S408, the control unit 20 judges whether the present instruction for invoking another screen is an instruction for an audio title list screen. When a negative judgment result is obtained, in step S413, the control unit 20 executes control for displaying the designated another screen and leaves the processing shown in the figure. On the other hand, when it is judged that another screen invoked in step S407 is an audio title list screen and an affirmative judgment result is obtained in step S408, the control unit 20 proceeds to step S409.

In step S409, the control unit 20 creates, with reference to the audio file metadata table (FIG. 3), display image data of an audio title list screen for the selected artist and performs image display according to this display image data. Consequently, display content on the display screen unit 19A is switched from the artist list screen displayed so far to the audio title list screen for the artist of the list item in which the cursor is arranged last in the artist list screen. A flow of the processing from step S407 to step S409 corresponds to the transition until the audio title list screen for the artist A is displayed explained as a stage before transition from FIG. 11B to FIG. 11C.

In a state in which the audio title list screen is displayed in this way, first, in step S410, the control unit 20 waits for selection and determination operation for an audio title, which is presented as a list item in the audio title list screen, to be performed.

In step S410, the control unit 20 judges whether selection and determination operation for a list item of an audio tile is performed. When an affirmative judgment result is obtained, in step S411, the control unit 20 outputs a request for start of reproduction of an audio file corresponding to the selected and determined audio title and leaves the processing shown in the figure. A flow of the processing corresponds to the transition from the display of the artist list screen to audio file reproduction shown in FIG. 11C.

On the other hand, when a negative judgment result is obtained in step S410, in step S412, the control unit 20 judges whether operation for invoking another interface screen other than the audio list screen is performed. When a negative judgment result is obtained in step S412, the control unit 20 returns to step S410. On the other hand, when an affirmative judgment result is obtained in step S412, in step S413, the control unit 20 shifts to display of the another screen designated to be invoked.

Figure 14:
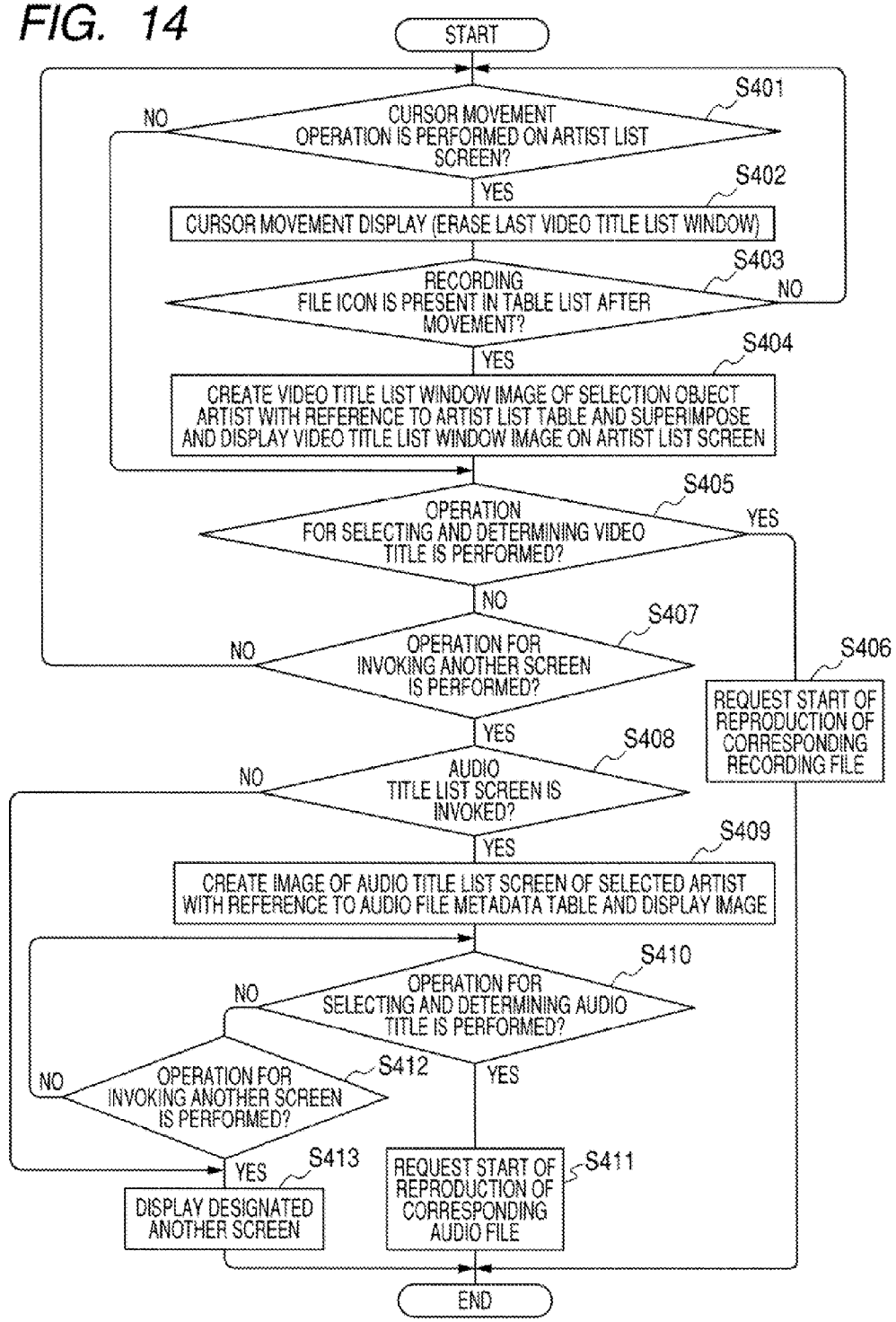
FIG. 14 is a flowchart showing an example of a processing procedure for shifting to audio file reproduction or recording file reproduction with the artist list screen as a starting point.
Figure 15:
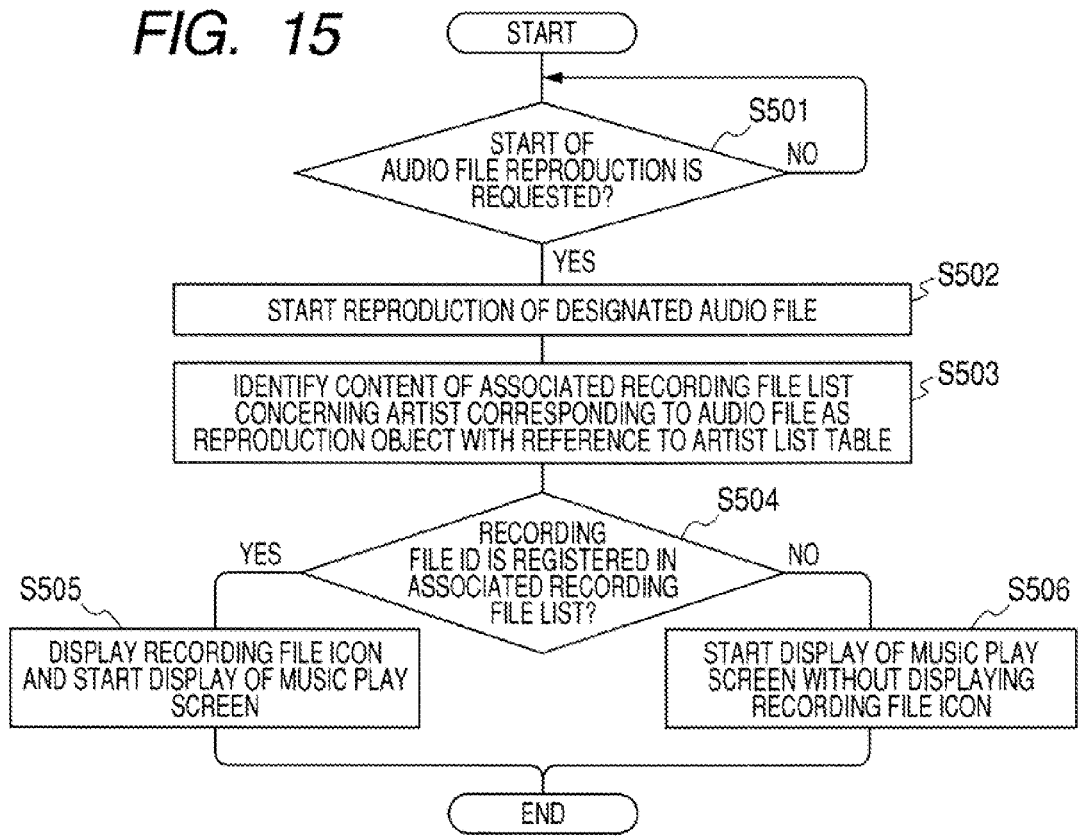
FIG. 15 is a flowchart showing an example of a processing procedure for audio file reproduction responding to an audio file reproduction start request.

The flowchart in FIG. 15 shows an example of a processing procedure responding to the request for start of reproduction of the audio file outputted in step S411 in FIG. 14.

First, in step S501, the control unit 20 wais for the request for start of reproduction of the audio file to be obtained. When the request for start of reproduction of the audio file is issued according to, for example, execution of step S411 in FIG. 14 as described above, the control unit 20 shifts to a procedure in step S502 and subsequent steps.

In step S502, the control unit 20 starts reproduction and output of the audio file designated by the request for start of reproduction of the audio file obtained in step S501. In other words, the control unit 20 specifies the audio file designated by the request for start of reproduction of the audio file using an audio file ID of the audio file and issues a reproduction command for the audio file using the audio file ID. According to the reproduction command, the audio file indicated by the designated audio file ID is read out from the storing unit 21. The audio file is subjected to signal processing and reproduced and outputted by the reproduction processing unit 22 and the audio-output processing unit 15.

Simultaneously with the processing in step S502, the control unit 20 executes, according to a procedure from step S503 to step S506, processing for displaying the music play screen shown in FIG. 11C.

First, in step S503, the control unit 20 identifies, from the artist list table, content of an associated recording file in a list item of an artist corresponding to an audio file to be currently reproduced. In step S504, the control unit 20 judges, as a result of the identification, whether there is registration of a recording file ID in the associated recording file.

When it is judged that registration of a recording file ID is present and an affirmative judgment result is obtained in step S504, the control unit 20 proceeds to step S505. In step S505, for example, as shown in FIG. 11C, the control unit 20 displays the recording file icon 101 in a superimposing manner and, then, executes display control processing for displaying the music play screen.

On the other hand, when a negative judgment result is obtained in step S504, in step S506, the control unit 20 executes display control processing for displaying the music play screen without displaying the recording file icon 101 in a superimposing manner.

Figure 16:
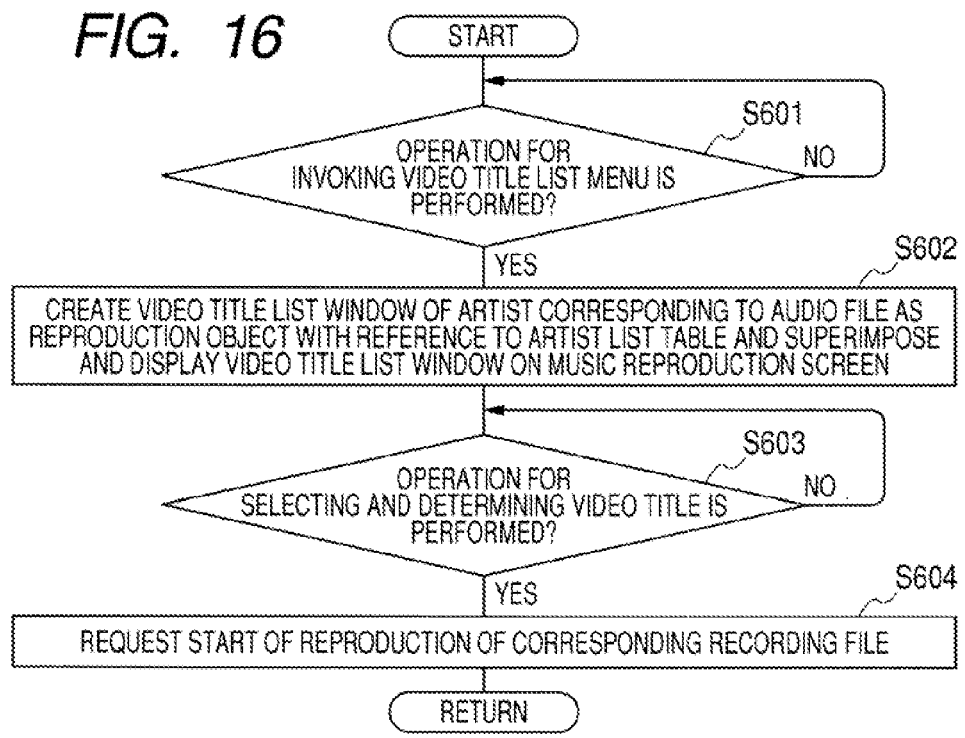
FIG. 16 is a flowchart showing an example of a processing procedure for shifting to recording file reproduction from a state of reproduction of an audio file according to operation.

A flowchart in FIG. 16 shows an example of a processing procedure responding to a case in which, for example, as indicated as the transition from FIG. 11C to FIG. 11D and from FIG. 11D to FIG. 11E, the video title window 112 is displayed and an instruction for reproduction of a video title is issued as operation for the music play screen on which the recording file icon 101 is displayed.

First, in step S601, in a state in which the music play screen on which the recording file icon 101 is displayed as shown in FIG. 11C is displayed on the display screen unit 19A, the control unit 20 waits for operation for invoking the video title list window 112 to be invoked. When operation equivalent to click on the recording file icon 101 on the music play screen is performed, for example, as explained above, the control unit 20 proceeds from step S601 to step S602.

In step S602, in the same manner as step S404 in FIG. 14, the control unit 20 executes, with reference to the artist list table, processing for displaying the video title window 112 of an artist to which an audio file to be currently reproduced corresponds. Then, in step S603, the control unit 20 waits for video title selection and determination operation for the video title list window 112 to be performed. Although not shown in the figure, for example, while the control unit 20 waits for video title selection and determination operation in step S603, when a command for erasing the video title list window 112 is outputted because, for example, a fixed time has elapsed without specific operation or operation for erasing the video title list window 112, the control unit 20 executes display control to erase the display of the video title list window 112.

When a judgment result that video title selection and determination operation is performed is obtained in step S603, in step S604, the control unit 20 outputs a request for start of reproduction of a recording file corresponding to the selected and determined video title. In response to this request for start of reproduction of the recording file, for example, as described later with reference to FIG. 20, reproduction of the corresponding recording file and display of a video play screen following the reproduction are performed. In other words, the transition from audio file reproduction to recording file reproduction shown in FIG. 11D to FIG. 11E (or FIG. 12F to FIG. 12C) is realized.

An example of a processing procedure for starting display of the recording file list screen shown in FIG. 12A is explained with reference to the flowchart in FIG. 17.

First, in step S701, the control unit 20 waits for an instruction for display of a recording file list screen to be obtained. When an instruction for display of a recording file list is obtained according to, for example, operation for instructing display of a recording file list screen on the operation unit 23, the control unit 20 proceeds to a procedure in step S702 and subsequent steps.

In step S702, the control unit 20 accesses the recording file associated metadata folder of the storing unit 12 and reads out a group of recording file associated metadata stored in the recording file associated metadata folder. Then, in step S703, as initialization processing, the control unit 20 substitutes 1 in a variable "m". The variable "m" indicates processing order for processing after that set for the recording file associated metadata read in step S702. An example of the structure of the recording file associated metadata is shown in FIG. 9.

In step S704, the control unit 20 executes processing for an mth recording file associated metadata in processing order among the recording file associated metadata read in step S702. A processing procedure in step S704 is shown in FIG. 18.

Figure 18:
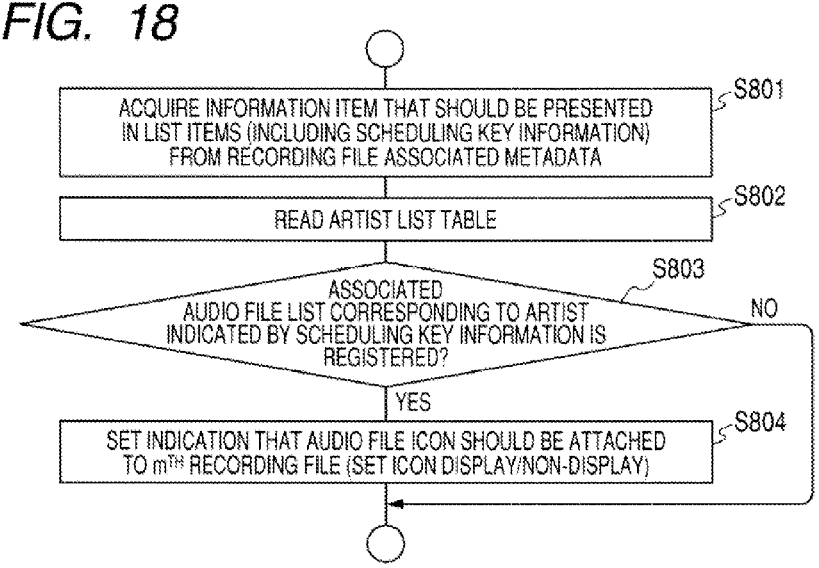
FIG. 18 is a flowchart showing an example of a processing procedure for recording file associated metadata processing.

In FIG. 18, first, in step S801, the control unit 20 acquires, with reference to the mth recording file associated metadata to be currently processed, content of an information item that should be presented in a list table for a recording file to which this recording file associated metadata corresponds, which should be displayed in the recording file list screen. More specifically, for example, for each of list items of the recording file screen shown in FIG. 12A, when there are a title (a program title) of the recording file and an audio file corresponding to an artist related to the title, the audio file icon 102 for notifying to that effect is displayed. Therefore, information items that should be acquired in step S801 are a program title and an artist ID as scheduling key information.

In step S802, the control unit 20 reads the artist list table stored in the memory unit 21.

In step S803, the control unit 20 judges, with reference to an associated audio file of a list item to which the artist ID registered in the scheduling key information acquired in step S801 corresponds, whether an audio file ID is registered in the artist list table.

When an affirmative judgment result is obtained in step S803, this means that there is an audio file associated with a recording file corresponding to the mth recording file associated metadata with respect to the artist in the audio file. Thus, in this case, in step S804, the control unit 20 sets an indication that a list item of the recording file corresponding to the mth recording file associated metadata should be displayed with the audio file icon 102 attached thereto. On the other hand, when a negative judgment result is obtained in step S803, this means that there is no audio file associated with the recording file associated with the mth recording file associated metadata with respect to the artist in the audio file. Thus, in this case, the control unit 20 skips step S804 to set an indication that the recording file associated with the mth recording file associated metadata is not displayed with the audio file icon 102 attached thereto. In other words, setting of display/non-display concerning the audio file icon 102 in a list item of one recording file is included in the procedure in FIG. 18.

Figure 17:
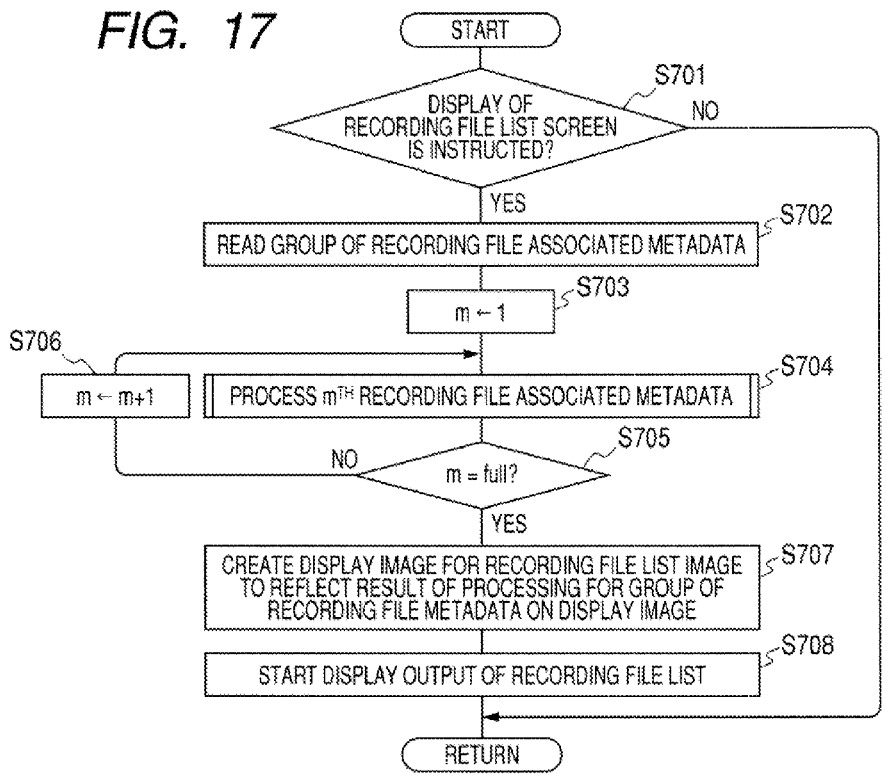
FIG. 17 is a flowchart showing an example of a processing procedure for displaying and outputting a recording file list screen.

After executing the procedure in FIG. 18, the control unit 20 proceeds to step S705 in FIG. 17. In step S705, the control unit 20 judges whether the present variable "m" is a maximum value (full). When a negative judgment result is obtained, this means that unprocessed recording file associated metadata remains. Thus, in this case, in step S706, the control unit 20 increments the variable "m" and, then, returns to step S704 to perform processing for the next recording file associated metadata.

On the other hand, when processing for all the recording file associated metadata is executed and an affirmative judgment result is obtained in step S705, the control unit 20 proceeds to step S707.

In step S707, the control unit 20 creates display image data of a recording file list screen to reflect, on the display image data, a result of the processing for the recording file associated metadata performed so far. Every time the recording file associated metadata is processed, as a result, a program title that should be displayed in a table list of a recording file corresponding to the recording file associated metadata is recognized and setting of display/non-display of the audio file icon 102 is performed. Thus, results of the recognition and the setting are reflected on the display image data. In step S708, the control unit 20 executes control to start display of the display image data, i.e., display the recording file list screen on the display unit 19.

An example of a processing procedure for shifting to recording file reproduction or audio file reproduction with a recording file list screen as a starting point as explained with reference to FIGS. 12A to 12F is explained with reference to the flowchart in FIG. 19.

First, in step S901, the control unit 20 judges whether operation for moving the cursor 120 on a recording file list screen currently being displayed is performed. When a negative judgment result is obtained, the control unit 20 proceeds to step S905 described later. On the other hand, when an affirmative judgment result is obtained, the control unit 20 proceeds to step S902.

In step S902, the control unit 20 moves the cursor 120 to a position of a list item of another recording file and display the cursor 120 according to the cursor moving operation. At this point, when the audio title list window 113 is displayed in a list item in which the cursor 120 is arranged before the movement of the cursor 120, the control unit 20 erases the video title list window 113 according to the present movement of the cursor 120.

In step S903, the control unit 20 judges whether the audio file icon 102 is displayed in a list item in which the cursor 120 is arranged according to the present cursor movement. When a negative judgment result is obtained, the control unit 20 returns to step S901. When an affirmative judgment result is obtained, the control unit 20 proceeds to step S904.

In step S904, with reference to the artist list table stored in the memory unit 21, the control unit 20 identifies content of an associated audio file for a recording file (a selection object recording file) indicated by the list item in which the cursor 120 is currently arranged. The control unit 20 creates, on the basis of a result of this identification, display image data of the audio title list window 113 for the selection object recording file. The control unit 20 executes, using this display image data, display control processing to display the audio title list window 113 on the recording file list screen in a superimposing manner in, for example, the display form shown in FIG. 12B.

In step S905, the control unit 20 judges whether selection and determination operation for an audio title is performed as operation for the audio title list window 113 currently displayed. At a stage of processing in step S905, the audio title list window 112 is not displayed in some case (e.g., the cursor 12 is not arranged in "drama A" in FIGS. 12A and 12B). However, in this case, in step S905, the control unit 20 outputs a negative judgment result.

When an affirmative judgment result is obtained in step S905, the control unit 20 proceeds to step S906. In step S906, the control unit 20 outputs a request for start of reproduction of an audio file corresponding to the audio title selected and determined in step S905 and leaves the processing shown in the figure. A flow of this processing corresponds to the transition from FIG. 12B to FIG. 12E.

On the other hand, when a negative judgment result is obtained in step S905, the control unit 20 proceeds to step S907.

In step S907, the control unit 20 judges whether selection and determination operation for a recording file title on the recording file list screen is performed. When an affirmative judgment result is obtained, the control unit 20 proceeds to step S908. In step S908, the control unit 20 outputs a request for start of reproduction of a recording file corresponding to the selected and determined recording file title and leaves the processing shown in the figure. A flow of this processing corresponds to the transition from the recording file list screen to audio file reproduction shown in FIG. 12C.

When a negative judgment result is obtained in step S907, in step S909, the control unit 20 judges whether operation for invoking display of another interface screen other than the recording file list screen is performed. When it is judged that operation is not specifically performed and a negative judgment result is obtained, the control unit 20 returns to step S901. On the other hand, when an affirmative judgment result is obtained, in step S910, the control unit 20 executes necessary control processing for displaying the another interface screen designated by the operation performed in step S909.

The flowchart in FIG. 20 shows an example of a processing procedure for starting reproduction of a recording file involving display of the video play screen shown in FIG. 11E, FIG. 12C, or the like. The processing shown in the figure is processing responding to the request for start of reproduction of the recording file outputted in step S406 in FIG. 14, step S604 in FIG. 16, step S908 in FIG. 19, and the like.

First, in step S1001, the control unit 20 waits for the request for start of reproduction of the recording file to be obtained. When the request for start of reproduction of the recording file is obtained, the control unit 20 shifts to a procedure in step S1002 and subsequent steps.

In step S1002, the control unit 20 starts reproduction and output of the recording file designated by the request for start of reproduction of the recording file obtained in step S1001. The control unit 20 reads out the recording file designated by the request for start of reproduction of the recording file from the storing unit 12 and executes reproduction control to perform decoding processing by the reproduction processing unit 22 and reproduction and output with images and sound after the decoding processing.

The control unit 20 also executes, simultaneously with the processing in step S1002, processing for displaying the video play screen shown in FIG. 11A or FIG. 12C according to the procedure in steps S1003 to S1006.

First, in step S1003, the control unit 20 identifies, from the artist list table, content of an associated audio file in a table list of an artist for which a recording file (ID) to be currently reproduced is stored in an associated recording file. In step S1004, the control unit 20 judges whether there is an audio file ID registered in the associated audio file as a result of the identification.

When it is judged that the audio file ID is registered and an affirmative judgment result is obtained in step S1004, the control unit 20 proceeds to step S1005. In step S1005, the control unit 20 executes display control processing for displaying the video play screen on which the audio file icon 102 is displayed as shown in FIG. 12C.

On the other hand, when a negative judgment result is obtained in step S1004, the control unit 20 executes display control processing for displaying a video play screen without the audio file icon 102.

The flowchart in FIG. 21 shows an example of a processing procedure responding to a case in which, for example, as shown as the transition from FIG. 12C to FIG. 12D and from FIG. 12D to FIG. 12E or the transition from FIG. 11E to FIG. 11F and from FIG. 11F to FIG. 11C, the audio title window 113 is displayed and an instruction for reproduction of an audio title is given as operation for the video play screen on which the audio file icon 102 is displayed.

First, in step S1101, in a state in which the video play screen on which the audio file icon 102 is displayed is displayed on the display screen unit 19A as shown in FIG. 12C, the control unit 20 waits for operation for invoking the audio title list window 113 to be performed. For example, as explained above, when operation equivalent to click on the audio file icon 102 on the video play screen is performed, the control unit proceeds from step S1101 to step S1102.

In step S1102, first, the control unit 20 acquires, with reference to scheduling key information of recording file associated metadata of a recording file (ID) to be currently reproduced, an artist ID registered in the scheduling key information. Then, the control unit 20 captures content stored in an associated audio file of the acquired artist ID from the artist list table. The control unit 20 creates display image data of the audio file list window 113 using an audio file ID captured from the associated audio file and displays the display image data on the video play screen in a superimposing manner.

In step S1103, the control unit 20 waits for audio title selection and determination operation for the audio file list window 113 to be performed. In this case, as in the case described above, for example, while the control unit 20 waits for audio title selection and determination operation in step S1103, when a command for erasing the audio file list window 113 is outputted because, for example, a fixed time has elapsed without specific operation or operation for erasing the audio file list window 113, the control unit 20 executes display control to erase the display of the audio file list window 113.

When a judgment result that audio title selection and determination operation is performed is obtained in step S1103, in step S1104, the control unit 20 outputs a request for start of reproduction of an audio file corresponding to the selected and determined audio title. In response to this request for start of reproduction of the audio file, as explained above with reference to FIG. 15, reproduction of the requested audio file and display of a music play screen following the reproduction are performed. In this way, the transition from recording file reproduction to audio file reproduction shown in FIG. 12D to FIG. 12E or FIG. 11F to FIG. 11C is realized.

A computer program executed by the CPU of the control unit 20 in order to realize the processing in the flowcharts explained above is stored in the storing unit 12 in advance as explained above. Besides, it is also conceivable to store the computer program in the storing unit 12 by installing the computer program from, for example, a personal computer connected through the data interface 11. Alternatively, it is conceivable to provide a driving corresponding to a storage medium of a predetermined removable format in the portable content player 1 and, then, store the computer program in the storing unit 12 by installing the computer program from this storage medium. It is also conceivable to store the computer program in a storage device in a server or the like on a network and, then, give a network function to the portable content player 1 itself, download to acquire the computer program from the server, and install the computer program.

Processing procedures for realizing reproduction of a recording file and an audio file, the structure of the various list tables that should be used in processing, and the like according to the embodiment are not limited to those explained with reference to the flowcharts, the data structure diagrams, and the like and can be changed as appropriate.

For example, as an artist associated rating point used for specifying a program that should be scheduled-recorded, as indicated as steps S4 and S5 in FIG. 5, an average of file associated rating points of all table lists having a common artist ID (artist name) as an attribute item is calculated from the audio file metadata table. However, the significance of the artist associated rating point is to indicate a degree of importance and a degree of interest for the user concerning each of artists as numerical values. Therefore, a method of calculating the artist associated rating point is not limited to the calculation of an average and may be, for example, calculation by simple addition of file associated rating points.

As information that should be used for calculation of an artist associated rating point, information other than a file associated rating point is conceivable.

For example, first, as attribute information for each of audio files (e.g., attribute information stored for each list tables of the audio file metadata table), information indicating the number of times the audio file is reproduced so far in the portable content player 1 (number-of-times-of-reproduction information) is included. The number-of-times-of-reproduction information of all table lists having the common artist ID (artist name) as an attribute item is collected and a predetermined algorithm and arithmetic operation are performed using values of the collected number-of-times-of-reproduction information to obtain an artist associated rating point.

In most of audio content players, reproduction by a so-called playlist is possible. The playlist is a reproduction instruction information unit for an audio file that the user creates, after selecting arbitrary audio files from audio files (music titles) stored in the storing unit 12, by arbitrarily setting reproduction order of the audio files. For the user, the play list is treated like an album that the user creates by himself/herself. For example, the user can create such a play list as many as necessary, select a play list in the same manner as selecting an album, and reproduce an audio file in the play list.

Consequently, it can be said that preference of the user related to the music titles is reflected on content of the audio files (the music titles) registered in the play list. For example, it can be understood that the music titles registered in the play list are music titles that the user likes. It can be assumed that, in the play list, for example, a music title in earlier reproduction order has a higher degree of preference for the user. Thus, it is conceivable to use metadata concerning music registered in the play list as parameters for calculating an artist associated rating point.

As explained above, an audio file stored in the storing unit 12 of the portable content player 1 is transferred by an audio content management application installed in a personal computer or the like through the external data interface 11. Then, it can be considered that, for example, as a date and time when an audio file was transferred is closer to the present, a degree of interest of the user in the audio file is higher. Therefore, it is conceivable to have information on a date and time of transfer (transfer date and time information) as metadata related to each of audio files and use this transfer date and time information as a parameter for calculating an artist associated rating point.

Moreover, it is also conceivable to perform an arithmetic operation conforming to a predetermined rule to calculate an artist associated rating point using plural parameters selected out of the file associated rating point, the number-of-times-of reproduction information, the play list content, the transfer date and time information, and the like.

In the embodiment described above, the artist associated rating point is used for specifying a program that should be scheduled-recorded. In other words, a program that should be scheduled-recorded is specified with an artist name in which the user is highly interested as a key word. However, as an attribute item of an audio file that should be used as a keyword is not limited to this. For example, an album title, a music title, and the like can also be adopted.

In the embodiment described above, recording schedule setting for a specified program is automatically performed as an operation performed by using a result of specifying a broadcast-scheduled program in which the user is highly interested. However, operations other than this are also conceivable.

For example, when there is a list item of an artist used as a keyword for specifying a program in an artist list screen, information concerning the specified program (broadcast-scheduled program information) is displayed in association with this list item. For example, as the video title list window 112 shown in FIG. 11B, a list of specified programs is presented and displayed. As contents that should be displayed as the broadcast-scheduled program information, necessary information only has to be selected from information stored by program unit information in an EPG such as a program title, a channel, a broadcast time frame, and program content taking into account a display size and the like of the broadcast-scheduled program information. By looking at such broadcast-scheduled program information, the user can learn in advance that a program in which an artist is highly interested is in a broadcast schedule and also learn information concerning the program. When the keyword for specifying a program is an album title or a music title, in the same manner as described above, the broadcast-scheduled program information can be displayed on the album title list screen, the music title list screen, or the like.

When operation for selecting and determining a program indicated in the broadcast-scheduled program information is performed on the artist list screen, the album title list screen, and the music title list screen on which the broadcast-scheduled program information is displayed as described above, it is conceivable to make it possible to perform scheduled recording setting for the selected and determined program. A situation in which the selected and determined program is already being broadcasted is anticipated. However, in such a case, it is conceivable to receive the selected and determined program and reproduce and output videos and sound of the program.

When an electronic program guide based on EPG data is normally displayed on the display screen unit 19A, it is also conceivable to additionally display, in association with a display space of a specified broadcast scheduled program, an icon indicating that the program is highly important for the user. In this case, when a keyword for specifying the broadcast scheduled program is an artist name, it is simpler and visually enjoyable if an artist is indicated by a pattern of an icon. When the keyword is an album title or a music title, a pattern of an icon indicating an album or music is used.

It is also conceivable to make it possible to create, as the electronic program guide, an image for presenting only a specified program scheduled to be broadcasted and display the image.

The information processing apparatus to which the present invention is applied is not limited to the portable content player according to the embodiment described above. For example, the present invention can also be applied to a cellular phone and the like that can store and reproduce audio and video contents and can receive a television broadcast such as the 1 seg. The present invention is not limited to portable apparatuses. The present invention can also be applied to, for example, a car audio apparatus and a stationary apparatus. In this connection, a television broadcast receiving function that the information processing apparatus should have is not limited to the 1 seg broadcast. The television broadcast receiving function may be applicable to, for example, a normal digital or analog terrestrial broadcast, a satellite broadcast, and a CATV. Moreover, for example, the information processing apparatus may be used for not only the television broadcast but also a radio broadcast and the like.

It should be understood by those skilled in the art that various modifications, combinations, sub-combinations, and alterations may occur depending on design requirements and other factors insofar as they are within the scope of the appended claims or the equivalents thereof.

What is claimed is:

1. An information processing apparatus comprising:
   a solid-state storage for storing audio data to which a user can listen and metadata corresponding to the audio data;
   a processor executing instructions to perform:
       sorting the audio data based on the corresponding metadata; and
           calculating a rating value of the audio data based on a plurality of prior user ratings given to the audio data, the calculated rating value of the audio data being stored in the solid-state storage as a part of the corresponding metadata;
   a tuner for acquiring electronic program guide information indicating programs scheduled to be broadcasted;
   wherein the processor further executes instructions to perform:
       extracting a piece of the metadata indicating an artist performing in the audio data;
       executing comparison processing for comparing the piece of metadata and the electronic program guide information to identify at least a program in which the artist participates;
       selecting and recording, when a rating value of the artist calculated based on a plurality of prior ratings given by the user to the artist is equal to or higher than a predetermined rating value, the program from the broadcast-scheduled programs indicated by the electronic program guide information;
       causing a display device to display an artist list including the artist;
       associating the recorded program with the artist;
       causing the display device to display a first indicator in the artist list to indicate that a recorded program corresponding to the artist is available, the first indicator being adjacent to a name of the artist; and
       in response to a selection of the first indicator, causing the display device to display a title of the recorded program along with the artist list.

2. An information processing apparatus according to claim 1, wherein the tuner receives a broadcast wave including video data of the program, and
   the processor further executes instructions to perform:
       generating scheduling instruction information for causing the solid-state storage to store the selected program, channel information, recording start time information, and recording end time information of the program; and
       causing, on the basis of the scheduling instruction information, the tuner to receive the broadcast wave, and causing the solid-state storage to store the video data included in the broadcast wave.

3. The information processing apparatus according to claim 1, wherein the processor further executes instructions to perform:
   causing a reproduction device to reproduce audio data corresponding to the artist;
   causing the display device to display an audio-reproducing screen;
   causing the display device to display a second indicator in the screen to indicate that the recorded program corresponding to the artist is available;

in response to a selection of the second indicator, causing the display device to display the title of the recorded program in the screen; and causing the reproduction device to reproduce the recorded program if the title of the recorded program is selected.

4. The information processing apparatus according to claim 3, wherein the processor further executes instructions to perform:

causing the display device to display a program-reproducing screen when reproducing the recorded program;

causing the display device to display a third indicator in the program-reproducing screen to indicate that audio data corresponding to the artist is available; and in response to a selection of the third indicator, causing the display device to display a title of the audio data corresponding to the artist in the program-reproducing screen.

5. An information processing apparatus according to claim 4, wherein the processor further executes instructions to cause the reproduction device to reproduce the audio data after the title of the audio data is selected.

6. An information processing method comprising the steps of:

storing audio data to which a user can listen and metadata corresponding to the audio data;

sorting the audio data based on the corresponding metadata;

calculating a rating value of the audio data based on a plurality of prior user ratings given to the audio data, the calculated rating value of the audio data being stored as a part of the corresponding metadata;

acquiring electronic program guide information indicating programs scheduled to be broadcasted;

extracting a piece of the metadata indicating an artist performing in the audio data;

executing comparison processing for comparing the piece of metadata and the electronic program guide information to identify at least a program in which the artist participates;

selecting and recording, when a rating value of the artist calculated based on a plurality of prior ratings given by the user to the artist is equal to or higher than a predetermined rating value, the program from the broadcast-scheduled programs indicated by the electronic program guide information; and displaying an artist list including the artist;

associating the recorded program with the artist;

displaying a first indicator in the artist list to indicate that a recorded program corresponding to the artist is available, the first indicator being adjacent to a name of the artist; and in response to a selection of the first indicator, displaying a title of the recorded program along with the artist list.

7. An information processing method according to claim 6, further comprising the steps of:

receiving a broadcast wave including video data;

generating scheduling instruction information for storing the program selected in the program selecting step, channel information, recording start time information, and recording end time information of the program; and storing the video data included in a broadcast wave received in the receiving step on the basis of the scheduling instruction information.

8. The information processing method according to claim 6, further comprising:

reproducing audio data corresponding to the artist;

displaying an audio-reproducing screen;

displaying a second indicator in the screen to indicate that the recorded program corresponding to the artist is available;

in response to a selection of the second indicator, displaying the title of the recorded program in the screen; and reproducing the recorded program if the title of the recorded program is selected.

9. The information processing method according to claim 8, further comprising:

displaying a program-reproducing screen when reproducing the recorded program;

displaying a third indicator in the program-reproducing screen to indicate that audio data corresponding to the artist is available; and in response to a selection of the third indicator, displaying a title of the audio data corresponding to the artist in the program-reproducing screen.

10. An information processing method according to claim 9, wherein the audio data is reproduced after the title of the audio data is selected.

11. A non-transitory recording medium having recording thereon a computer readable program for causing a computer to execute:

storing audio data to which a user can listen and metadata corresponding to the audio data;

sorting the audio data based on the corresponding metadata;

calculating a rating value of the audio data based on a plurality of prior user ratings given to the audio data, the calculated rating value of the audio data being stored as a part of the corresponding metadata;

receiving electronic program guide information indicating programs scheduled to be broadcasted;

extracting a piece of the metadata indicating an artist performing in the audio data;

comparing the piece of the metadata and the electronic program guide information to identify at least a program in which the artist participates;

selecting and recording, when a rating value of the artist calculated based on a plurality of prior ratings given by the user to the artist is equal to or higher than a predetermined rating value, the program from the broadcast-scheduled programs indicated by the electronic program guide information; and displaying an artist list including the artist;

associating the recorded program with the artist;

displaying a first indicator in the artist list to indicate that a recorded program corresponding to the artist is available, the first indicator being adjacent to a name of the artist; and in response to a selection of the first indicator, displaying a title of the recorded program along with the artist list.

12. An information processing apparatus comprising:

a solid-state storage configured to store audio data to which a user can listen and metadata corresponding to the audio data;

a processor configured to
sort the audio data based on the corresponding metadata; and calculate a rating value of the audio data based on a plurality of prior user ratings given to the audio data, the calculated rating value of the audio data being stored in the solid-state storage as a part of the corresponding metadata;

a tuner unit configured to acquire electronic program guide information indicating programs scheduled to be broadcasted;

wherein the processor is further configured to extract a piece of the metadata indicating an artist performing in the audio data;

execute comparison processing for comparing the piece of metadata the electronic program guide information to identify at least a program in which the artist participates;

select and record, when a rating value of the artist calculated based on a plurality of prior ratings given by the user to the artist is equal to or higher than a predetermined rating value, the program from the broadcast-scheduled programs indicated by the electronic program guide information;

cause a display device to display an artist list including the artist;

associate the recorded program with the artist;

cause the display device to display an indicator in the artist list to indicate that a recorded program corresponding to the artist is available, the indicator being adjacent to a name of the artist; and in response to a selection of the indicator, cause the display device to display a title of the recorded program along with the artist list.

* * * * *